US012802438B2

(12) United States Patent
Srinivasan et al.

(10) Patent No.: US 12,802,438 B2
(45) Date of Patent: Nov. 17, 2026

(54) SYSTEM MOUNTED IN A VEHICLE FOR PERFORMING ENHANCED PERCEPTIVE OPERATIONS AND METHOD OF OPERATION THEREOF

(71) Applicant: Tartan Aerial Sense Tech Private Limited, Bangalore (IN)

(72) Inventors: Gunasekaran Srinivasan, Thiruvalam (IN); Prakash Mathews Pothen, Thiruvalla (IN); Aditya Sunil Patil, Bellary (IN)

(73) Assignee: TARTAN AERIAL SENSE TECH PRIVATE LIMITED, Bangalore (IN)

( * ) Notice: Subject to any disclaimer, the term of this patent is extended or adjusted under 35 U.S.C. 154(b) by 291 days.

(21) Appl. No.: 18/395,152

(22) Filed: Dec. 22, 2023

(65) Prior Publication Data

US 2024/0212342 A1 Jun. 27, 2024

(30) Foreign Application Priority Data

Dec. 26, 2022 (IN) ............................ 202241075498

(51) Int. Cl.

*G06V 20/10* (2022.01)
*G06Q 50/02* (2024.01)
*G06V 10/56* (2022.01)
*G06V 20/58* (2022.01)

(52) U.S. Cl.

CPC ........... *G06V 20/188* (2022.01); *G06Q 50/02* (2013.01); *G06V 10/56* (2022.01); *G06V 20/58* (2022.01)

(58) Field of Classification Search

CPC ...... G06V 20/188; G06V 10/56; G06V 20/58; G06Q 50/02

See application file for complete search history.

(56) References Cited

U.S. PATENT DOCUMENTS

| | | | | |
|---|---|---|---|---|
| 11,074,447 | B1 * | 7/2021 | Fox | G01N 21/31 |
| 11,399,531 | B1 * | 8/2022 | Sibley | A01M 7/0089 |
| 12,075,769 | B2 * | 9/2024 | Humpal | A01M 7/0057 |
| 2021/0289693 | A1 * | 9/2021 | Harmon | B05B 1/20 |
| 2022/0053122 | A1 | 2/2022 | Scheiner et al. | |
| 2022/0117214 | A1 * | 4/2022 | Garner | A01C 23/04 |
| 2022/0117215 | A1 * | 4/2022 | Sibley | A01M 21/00 |
| 2022/0118555 | A1 * | 4/2022 | Sibley | A01M 21/046 |

(Continued)

FOREIGN PATENT DOCUMENTS

IN 202211037474 A 7/2022

*Primary Examiner* — Santiago Garcia
(74) *Attorney, Agent, or Firm* — Barta Jones, PLLC

(57) ABSTRACT

A system mounted in a vehicle includes a plurality of image-capture devices to capture a sequence of color images corresponding to a plurality of field-of views (FOVs) of a plurality of defined areas. The system includes one or more hardware processors to determine a health state of a crop plant and a growth state of the crop plant. A spray mode is determined and dynamically selected from a predefined list of spray modes based on the determined health state of the crop plant, the growth state of the crop plant, and a type of chemical to be sprayed from the obtained sequence of colour images. A different set of electronically controlled sprayer nozzles is automatically operated at different time instants to release the selected type of chemical from a predefined number of the electronically controlled sprayer nozzles based on the selected spray mode.

19 Claims, 11 Drawing Sheets

(56) References Cited

U.S. PATENT DOCUMENTS

| | | | | |
|---|---|---|---|---|
| 2022/0183208 | A1* | 6/2022 | Sibley | A01B 69/001 |
| 2023/0126714 | A1* | 4/2023 | Sibley | A01M 7/0032 239/74 |
| 2023/0166283 | A1* | 6/2023 | Sibley | A01M 7/005 239/587.5 |
| 2023/0386132 | A1* | 11/2023 | Chen | G06T 17/05 |
| 2024/0130350 | A1* | 4/2024 | Leger | A01M 21/043 |

* cited by examiner

SYSTEM MOUNTED IN A VEHICLE FOR PERFORMING ENHANCED PERCEPTIVE OPERATIONS AND METHOD OF OPERATION THEREOF

REFERENCE

This Patent Application makes reference to, claims the benefit of, and claims priority to an Indian Patent Application No. 202241075498, filed on Dec. 26, 2022, which is incorporated herein by reference in its entirely, and for which priority is hereby claimed under the Paris Convention and 35 U.S.C. 119 and all other applicable law.

TECHNICAL FIELD

The present disclosure relates generally to the field of agricultural machines and systems; and more specifically, to a system (i.e., an electro-mechanical agricultural equipment) mounted in a vehicle for performing enhanced perceptive operations on an agricultural field and a method of operation of the system.

BACKGROUND

With the rapid advancement of agricultural machines, implements, special-purpose vehicles, and vehicle mounted apparatus, productivity in agricultural operations have increased. However, existing vehicle-based chemical spraying systems are very complex in nature, where a particular system or machinery works only when it is from a same manufacturer. In other words, one system of one manufacturer is not compatible with another system of another manufacturer. This binds a farmer to use costly machineries and agricultural implements of one specific-manufacturer. For example, it is sometimes simply not possible or very technically challenging to use a conventional chemical spraying system of one manufacturer with another system of another manufacturer as crosstalk among different electronics and mechatronics systems is generally restricted or severely limited in use. Furthermore, existing devices are known to use conventional location determination techniques and systems, such as Global Positioning System (GPS) that is integrated with an agricultural vehicle for location determination. However, it is well-known that civilian use of GPS has an error-range of 1-10 meters, and sometimes more depending on signal reception issues in a particular area.

There are many other technical problems with conventional systems and method having agricultural applications, for example, chemical spraying machines. In a first example, conventional systems or agricultural special-purpose vehicles require row identification, where row-based processing forms an indispensable component of conventional systems. Conventional systems fail when proper rows are not demarcated in agricultural field. In a second example, there is a problem of over-engineering, i.e., too many sensor units, too much processing, and very complex machines. In such a situation, the chances of errors are high due to multiple failure points and at the same time makes such machines very costly, power intensive, and processing intensive, which are not suited for many sub-urban, urban, or rural farming conditions and needs. For instance, some existing systems use chlorophyll sensors or detectors to supplement or corroborate the visible-spectrum image sensors. However, still fail in accurately distinguish between two green looking objects, such as crops and weeds.

In a third example, other camera-based systems are known to aid in chemical spraying by an agricultural machine or vehicle. However, uneven land area of an agricultural field combined with uncertainty in surrounding environmental conditions while capturing images of agricultural field are found to severely and adversely impact the existing systems that are related to automated, precision, or spot spraying of chemicals, like herbicides, insecticides, or nutrients. The existing systems either fail or accuracy is severely impacted in such conditions. This causes the conventional machines, systems, and methods to misbehave or causes errors to differentiate between two green looking objects (e.g., crop plants and weeds) and result in either excess spraying or less than required spraying of chemicals either on the weeds or crop plants or misfire chemicals at wrong or unintended spots in an agricultural field.

Further limitations and disadvantages of conventional and traditional approaches will become apparent to one of skill in the art through comparison of such systems with some aspects of the present disclosure as set forth in the remainder of the present application with reference to the drawings.

SUMMARY

The present disclosure provides a system (i.e., an electro-mechanical agricultural equipment) mounted in a vehicle for performing enhanced perceptive operations on an agricultural field and a method of operation of the system. The present disclosure provides a solution to the existing problem of row identification required in existing camera-based spraying systems, incompatibility with other systems or other manufacturer's agricultural implements, high complexity, and power intensiveness of existing systems. Moreover, the existing systems either fail or accuracy is severely impacted when images are captured in a changing surrounding environmental condition, causing erroneous processing and unwanted wastage, or misfiring of chemical during a spray session. An aim of the present disclosure is to provide a solution that overcomes at least partially the problems encountered in prior art and provide an improved system that can be mounted in a vehicle (e.g., of another manufacturer) for performing controlled and enhanced perceptive operations (e.g., a machine-directed perceptive chemical spraying) on an agricultural field with increased reliability in real-world conditions. There is further provided an improved method of operation of the system which improves the perceptive ability of the system, which in turn improves the operations of the system.

These and other advantages, aspects, and novel features of the present disclosure, as well as details of an illustrated embodiment thereof, will be more fully understood from the following description and drawings.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

DETAILED DESCRIPTION OF THE DISCLOSURE

Figure 1A:
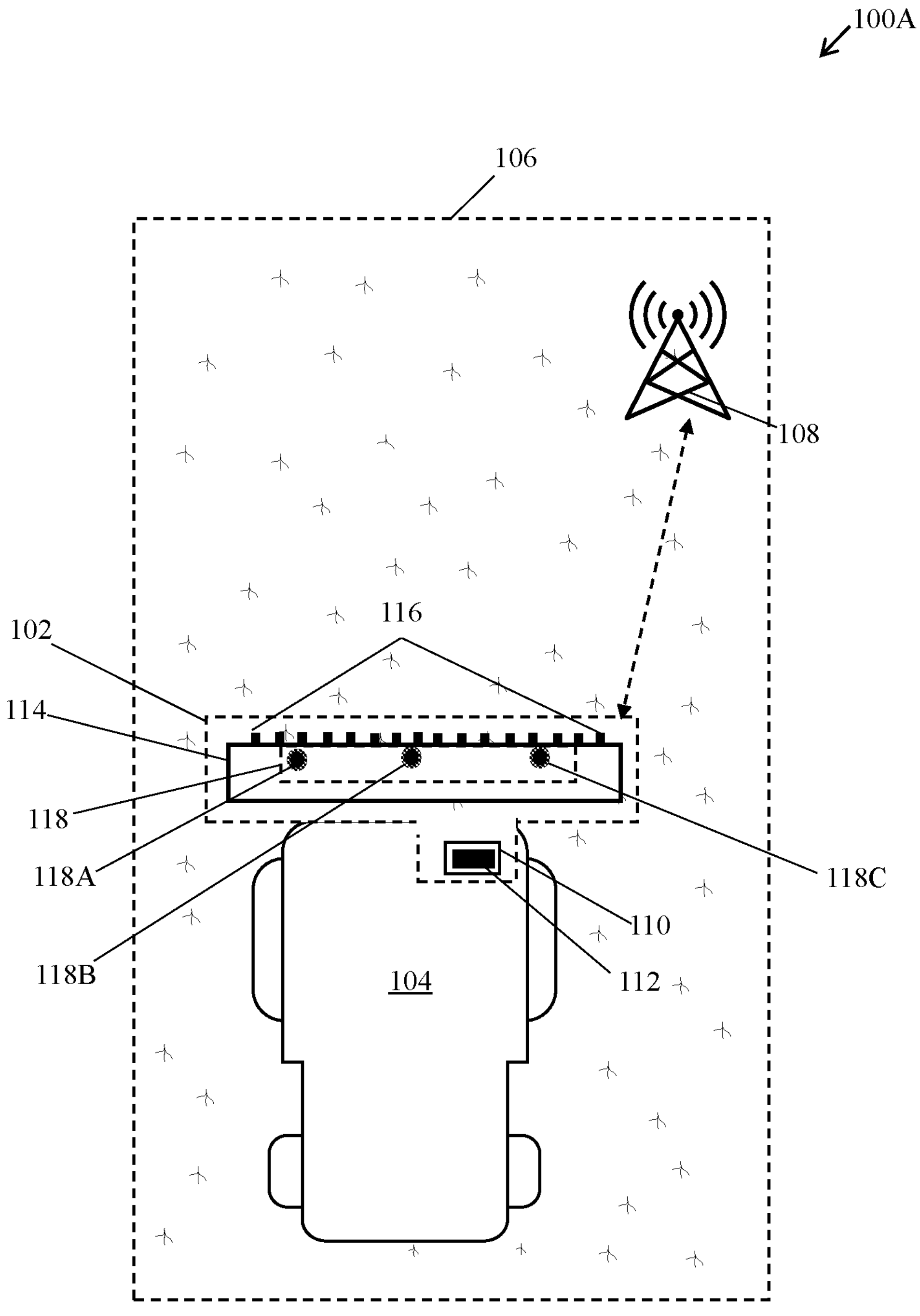
FIG. 1A is a diagram illustrating a system mounted in a vehicle for controlled and perceptive chemical spraying on an agricultural field, in accordance with an embodiment of the present disclosure.

Certain embodiments of the disclosure may be found in a system (i.e., an electro-mechanical agricultural equipment) mounted in a vehicle for performing enhanced perceptive operations on an agricultural field and a method of operation of the system. In one aspect, the present disclosure provides a system mounted in a vehicle. The system includes a plurality of image-capture devices configured to capture a sequence of colour images corresponding to a plurality of field-of-views (FOVs) of a plurality of defined areas of the agricultural field while the vehicle is in motion and one or more hardware processors are configured to obtain the sequence of colour images corresponding to the plurality of FOVs from the plurality of image-capture devices. The one or more hardware processors are configured to determine a health state of a crop plant and a growth state of the crop plant from the obtained sequence of colour images. Furthermore, the one or more hardware processors are configured to determine and dynamically select a spray mode from a predefined list of spray modes based on the determined health state of the crop plant, the growth state of the crop plant, and a type of chemical to be sprayed while the vehicle is in motion and automatically operate a different set of electronically controlled sprayer nozzles at different time instants to release the selected type of chemical from a predefined number of the electronically controlled sprayer nozzles based on the selected spray mode while the vehicle is in motion.

The disclosed system is technically advanced in terms of its perceptive ability and is intelligent enough to adapt to uneven agricultural land, is astutely perceptive to real-time changes in the surrounding environmental conditions and is not dependent on any row-identification. For example, in conventional systems, if crops are planted in proper rows and columns in an agricultural field, then only camera-assisted or camera-aided machines can function in real-world conditions. Unlike the conventional systems, the disclosed system of the present invention does not need any prior plantation format to be followed. The determination of the health state and the growth state of the identified crop plant is used to train an AI model to accurately distinguish between the crop plants and the weeds and further determine the chemical that is required to be sprayed on the identified crop plant. The system as a whole, is able to handle surrounding environmental conditions, such as variation in sunlight due to either cloud, rain, a shadow of a large object, like tree, while capturing an image, change in position of sun throughout the day, light intensity, a time of day when the system is operated etc.) and at the same time is able to capture non-blurry images. This in turn improves the subsequent operations of the system and imparts a perceptive ability to adapt to uneven agricultural land and handle surprisingly advanced real-time changes in the surrounding environmental conditions, such as change in shape of leaves due to wind, drooping of leaves, occlusion by weed, high weed density around the crop plants, and the like.

Furthermore, in the disclosed system, the one or more hardware processors are configured to determine and dynamically select a spray mode from a predefined list of spray modes based on the determined health state of the crop plant, the growth state of the crop plant, and a type of chemical to be sprayed while the vehicle is in motion and automatically operate a different set of electronically controlled sprayer nozzles at different time instants. This confers a technical effect of very accurate coverage of chemical in accordance with the growth state of the crop plant. For example, for 10-day crop pant and 1 month crop plant, there will be different growth stage, which the system can identify and accordingly re-calibrate its operations to mitigate unwanted losses in chemical usage as well as correct coverage of whole crop plant. The synergistic combination of the use of the health state of the crop plant, the growth state of the crop plant, and a type of chemical to be sprayed makes the system fail-safe and improves the automatic operation of the different set of electronically controlled sprayer nozzles at different time instants.

In an implementation, the determination of the health state of the crop plant from the obtained sequence of colour images comprises determining whether the crop plant is a diseased crop plant or a non-diseased crop plant. By virtue of determining whether the crop plant is the diseased crop plant or the non-diseased crop plant provides a current state of the crop plant, which is then used to determine the current requirement (e.g., nutrient, fungicide, or which chemical is most suitable etc.) for the identified crop plant.

In a further implementation, the determination of the health state of the crop plant from the obtained sequence of colour images further comprises identifying a foliar discoloration in the crop plant. The system is not limited to just identify heath state in terms of diseased and non-diseased plants but moves a step ahead further to identify the foliar discoloration in the crop plant, which in turn enables the system to detect the crop plant even with foliar discoloration that requires immediate attention.

In a further implementation, the determination of the growth state of the crop plant from the obtained sequence of colour images comprises determining a canopy of growth of the crop plant. The canopy refers to an above-ground portion of the crop plant formed by the collection of individual crop plant crowns. Thus, the determination of the canopy of growth of the crop plant improves the accuracy and reliability in the determination of the growth state of the crop plant.

In a further implementation, the determination of the growth state of the crop plant from the obtained sequence of colour images comprises determining a crown of growth of the crop plant. The crown of a crop plant refers to a total of an individual plant's above-ground parts, including stems, leaves, and reproductive structures. Thus, the determination of the canopy of growth of the crop plant and even the individual crowns further improve the accuracy and reliability in the determination of the growth state of the crop plant unlike conventional systems, which do not take into account the granularity to the extent of the crown and canopy of crop plants.

In a further implementation, the one or more hardware processors are further configured to distinguish crop plants from weeds based on the obtained sequence of colour images and control the predefined number of the electronically controlled sprayer nozzles to concomitantly spray a first type of chemical exclusively over the weeds and a second type of chemical exclusively over the crop plants. Thus, two different types of chemicals may be released concomitantly by improving the rate of operation of the system by almost 50% without any compromise in coverage of crop plants. Further, the wastage of energy in operation of system is reduced, which otherwise would require to perform same operation twice.

In a further implementation, the predefined list of spray modes comprises a perceptive spot spray mode, a herbicide spray mode, a pesticide spray mode, a diseased-plant spray mode, a nutrient spray mode, a blanket spray mode, an all-green spray mode, a foliar discoloration spray mode, or a combinatorial spray mode in which any two or more spray modes are concomitantly selected. The system provides new modes that can be employed to increase perceptibility and efficiency of operation of the system. For example, the perceptive spot spray mode not only takes into account the determined health state of the crop plant, but also the growth state of the crop plant, and the type of chemical to be sprayed while the vehicle is in motion and at the same time is able to handle change in the surrounding environmental conditions while capturing images of agricultural field. Similarly, the foliar discoloration spray mode allows enables the system to detect the crop plant even with foliar discoloration.

Advantageously, the combinatorial spray mode in which any two or more spray modes are concomitantly selected improves the productivity rate, by about 30-50%.

In a further implementation, the different set of electronically controlled sprayer nozzles are operated automatically to release two different types of chemicals when two different categories of crop plants are identified. As a result of the improved perceptive ability of the system, the system is able to operate and control the different set of electronically controlled sprayer nozzles to release two different types of chemicals concurrently when two different categories of crop plants (e.g., diseased and non-diseased; healthy crops and crops with foliar discolouration; crop plants with different growth states etc) are identified.

In a further implementation, the different set of electronically controlled sprayer nozzles are operated to release two or more different types of chemicals concurrently or alternatively when two or more different categories of crop plants and different categories of weeds are identified. As a result of the improved perceptive ability of the system, the system is able to operate and control the different set of electronically controlled sprayer nozzles either concurrently or alternatively as per user choice. Moreover, such operation enables the system to behave differently for different type of crop plants and weeds that overall increases the productivity of the system in the agricultural field.

In another aspect, the present disclosure provides a method of operation of the system mounted in a vehicle. The method comprises capturing, by a plurality of image-capture devices, a sequence of colour images corresponding to a plurality of field-of-views (FOVs) of a plurality of defined areas of the agricultural field while the vehicle is in motion and further obtaining, by one or more hardware processors, the sequence of colour images corresponding to the plurality of FOVs from the plurality of image-capture devices. The method comprises determining, by the one or more hardware processors, a health state of a crop plant and a growth state of the crop plant from the obtained sequence of colour images. The method further comprises determining and dynamically selecting, by the one or more hardware processors, a spray mode from a predefined list of spray modes based on the determined health state of the crop plant, the growth state of the crop plant, and a type of chemical to be sprayed while the vehicle is in motion and automatically operating, by the one or more hardware processors, a different set of electronically controlled sprayer nozzles at different time instants to release the selected type of chemical from a predefined number of the electronically controlled sprayer nozzles based on the selected spray mode while the vehicle is in motion. The method achieves all the advantages and technical effects of the system of the present disclosure.

It is to be appreciated that all the aforementioned implementations can be combined. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof. It will be appreciated that features of the present disclosure are susceptible to being combined in various combinations without departing from the scope of the present disclosure as defined by the appended claims. Additional aspects, advantages, features and objects of the present disclosure would be made apparent from the drawings and the detailed description of the illustrative implementations construed in conjunction with the appended claims that follow.

The following detailed description illustrates embodiments of the present disclosure and ways in which they can be implemented. In the following description, reference is made to the accompanying drawings, which form a part hereof, and in which is shown, by way of illustration, various embodiments of the present disclosure.

FIG. 1A is a diagram illustrating a system mounted in a vehicle for controlled and perceptive spraying on an agricultural field, in accordance with an embodiment of the present disclosure. With reference to FIG. 1A, there is shown a diagram 100 that comprises a system 102 mounted in a vehicle 104 for controlled and perceptive chemical spraying on an agricultural field 106. The system 102 includes a boom arrangement 114, which includes a different set of electronically controlled sprayer nozzles 116 and a plurality of image-capture devices 118 (such as a first image-capture device 118A, a second image-capture device 118B, and a third image-capture device 118C). There is further shown an external device 108 that is communicatively coupled to the system 102. In an implementation, the system 102 may further include a display device 110 for a user of the vehicle 104. A custom application 112 may be installed in the display device 110.

The system 102 is mounted in the vehicle 104 for performing controlled and perceptive operations (e.g., a machine-directed perceptive spot chemical spraying) on the agricultural field 106. The system 102 includes the boom arrangement 114 that includes the different set of electronically controlled sprayer nozzles 116 and the plurality of image-capture devices 118 configured to capture a plurality of field-of-views (FOVs) of a plurality of defined areas of the agricultural field 106. The system 102 further includes one or more hardware processors (shown in FIG. 2) that are configured to obtain a sequence of colour images corresponding to the plurality of FOVs from the plurality of image-capture devices 118. The one or more hardware processors are further configured to receive geospatial location correction data from the external device 108 that is placed at a fixed location in the agricultural field 106 and geospatial location coordinates associated with the boom arrangement 114 mounted on the vehicle 104. The geospatial location correction data may be RTK correction data used to correct global navigation satellite system, such as GPS errors while the vehicle 104 is in motion. The use of the geospatial location correction data (e.g., real-time kinematic positioning (RTK) correction data) from the external device 108 (e.g., an RTK base station) that is applied on the geospatial location coordinates obtained by a geospatial sensor provided in the boom arrangement, significantly improves the positional accuracy of the boom arrangement 114 that is provides a centimetre (cm) level accuracy of position of the boom arrangement when the vehicle 104 is in motion. This improves the accuracy to determine a distance and position of an object-of-interest, such as a crop plant, with respect to the position of the plurality of image-capture devices 118 as such devices are also mounted on the boom arrangement 114. In the conventional systems, typically a global positioning system (GPS) sensor inbuilt in a vehicle is employed for calculation of time to spray chemicals, which reduces the location accuracy.

The one or more hardware processors are further configured to execute mapping of pixel data of weeds or a crop plant in an image to distance information from a reference position of the boom arrangement 114 when the vehicle 104 is in motion. Unlike conventional systems, in the present disclosure, as the different set of electronically controlled sprayer nozzles 116 as well as the plurality of image-capture devices 118 are mounted in the boom arrangement 114 and cm level accurate spatial position of the boom arrangement is derived, the mapping of pixel data of weeds or the crop plant to distance information from the reference position of the boom arrangement 114 when the vehicle 104 is in motion, is also very accurate. Thereafter, the one or more hardware processors are further configured to cause a specific set of electronically controllable sprayer nozzles from amongst the different set of electronically controlled sprayer nozzles 116 to operate based on a defined confidence threshold and the executed mapping of pixel data. Moreover, the defined confidence threshold is indicative of a detection sensitivity of the crop plant. The use of the defined confidence threshold significantly improves the perceptive capability of the system 102 such that the spraying of chemicals is achieved with improved accuracy and precision for the correct time slots, at correct intended areas or spots and only when required with correct amount of spray and correct selection of a type of chemical irrespective of any change in the surrounding environmental conditions while capturing images of agricultural field 106. For example, an increase or a decrease in the defined confidence threshold dynamically changes the detection sensitivity of the crop plant increasing the perceptive capability of the system 102 making the system 102 fail-safe. Moreover, the system 102 is perceptive and intelligent enough to adapt to uneven agricultural land, is astutely perceptive to real-time changes in the surrounding environmental conditions, and not dependent on any row-identification.

Figure 1B:
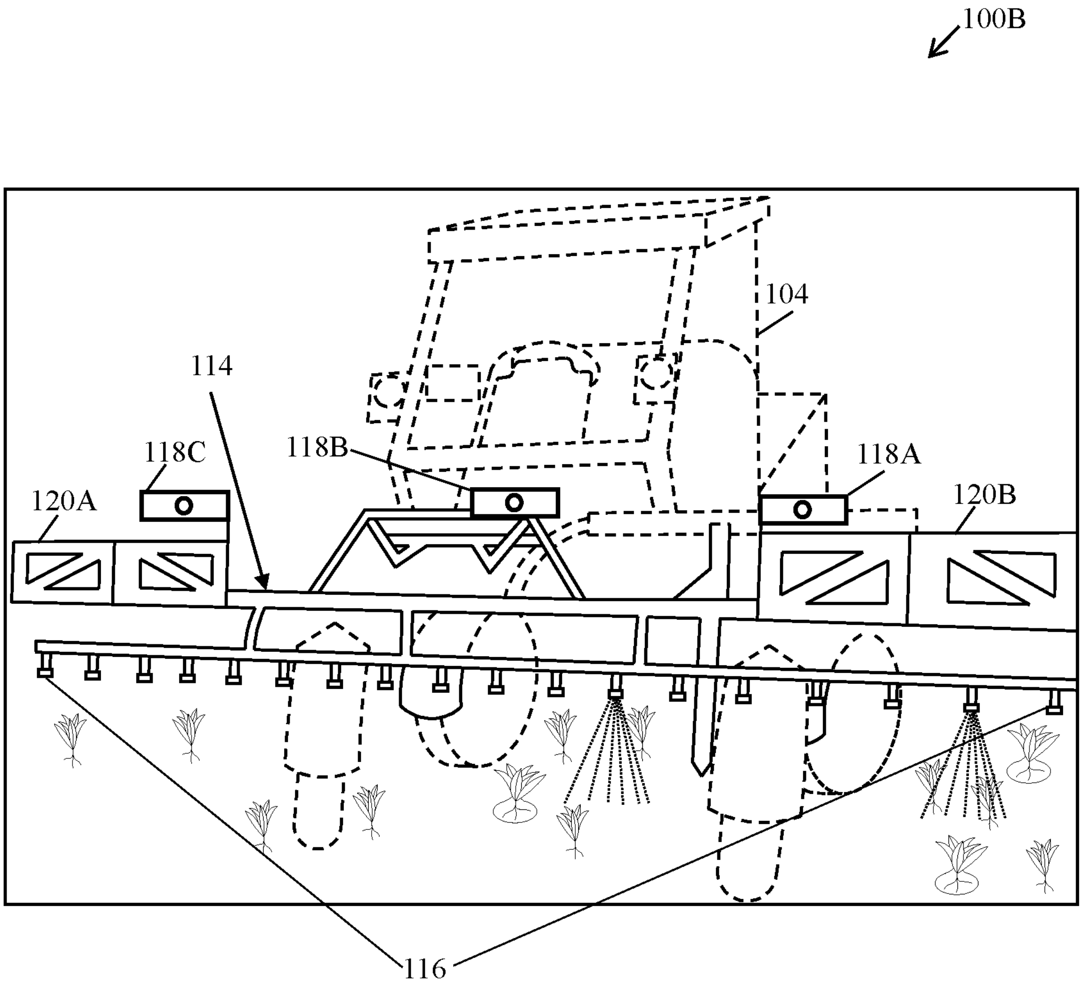
FIG. 1B is a diagram illustrating a boom arrangement mounted on a vehicle, in accordance with an embodiment of the present disclosure.

FIG. 1B is a diagram illustrating the boom arrangement mounted on a vehicle, in accordance with an embodiment of the present disclosure. FIG. 1B is described in conjunction with elements of FIG. 1A. With reference to FIG. 1B, there is shown the boom arrangement 114 mounted on the vehicle 104.

The boom arrangement 114 is removably mounted on the vehicle 104. The boom arrangement 114 includes one or more elongated booms that are interconnected through a single frame. The boom arrangement 114 comprises the different set of electronically controlled sprayer nozzles 116 and the plurality of image-capture devices 118. The different set of electronically controlled sprayer nozzles 116 are configured to spray a chemical on either a plurality of crop plants or weeds perceptively in a controlled manner, depending on an application scenario.

Each of the plurality of image-capture devices 118 may include suitable logic, circuitry, and/or interfaces that is configured to capture a plurality of field-of-views (FOVs) of a plurality of defined areas of the agricultural field 106 (of FIG. 1). In an implementation, the plurality of image-capture devices 118 are installed on the vehicle 104 (of FIG. 1A) and may include a left-side camera (e.g., a RGB camera), a right-side camera and a central camera. Examples of each of the plurality of image-capture devices 118 may include but not limited to, a RGB camera, a high dynamic range (HDR) camera, and the like. In an example, the boom arrangement 114 include one or more casings, such as a first box 120A, and a second box 120B that are used to store and protect the circuitry as well controller other electronics components (e.g., a controller) that are required for the functioning of the plurality of image-capture devices 118. Moreover, the plurality of image-capture devices 118 are arranged in a same plane in downward (i.e., lookdown) position. Similarly, the different set of electronically controlled sprayer nozzles 116 are also arranged in a same plane in the boom arrangement 114. In addition, each camera device from the plurality of image-capture devices 118 is arranged above the different set of electronically controlled sprayer nozzles 116 at a defined height. The defined height, i.e., a distance between the plane on which the plurality of image-capture devices 118 are arranged and the plane on which the different set of electronically controlled sprayer nozzles 116 are arranged is beneficially used by the one or more hardware processors (FIG. 2) to determine in advance precisely when to activate, which nozzles to activate, and a current distance between the boom arrangement and a plurality of crop plants that are to be sprayed when such crop plants reach almost underneath the the different set of electronically controlled sprayer nozzles 116. A FOV may be set, for example, of 1 meter, to acquire higher resolution and detailing in the captured images. Therefore, such arrangement of the plurality of image-capture devices 118 provides enough buffer time to the one or more hardware processors to process the images, for example, for crop detection, crop tracking, distinguishing from weeds, and/or for determination of the correct defined confidence threshold. Moreover, such buffer time is further used by the one or more processors to activate a specific set of electronically controllable sprayer nozzles at a specific time and to deactivate another set of electronically controllable sprayer nozzles in a proactive manner. In other words, such buffer time can be used by the one or more processors to determine a desired time in advance, such as to activate or deactivate the specific set of electronically controllable sprayer nozzles at a desired time. Moreover, the specific set of electronically controlled sprayer nozzles 116 are activated to spray at only intended areas or spots and only when required with correct amount of spray and correct selection of a type of chemical irrespective of any change in the surrounding environmental conditions while capturing images of the agricultural field 106.

Figure 2:
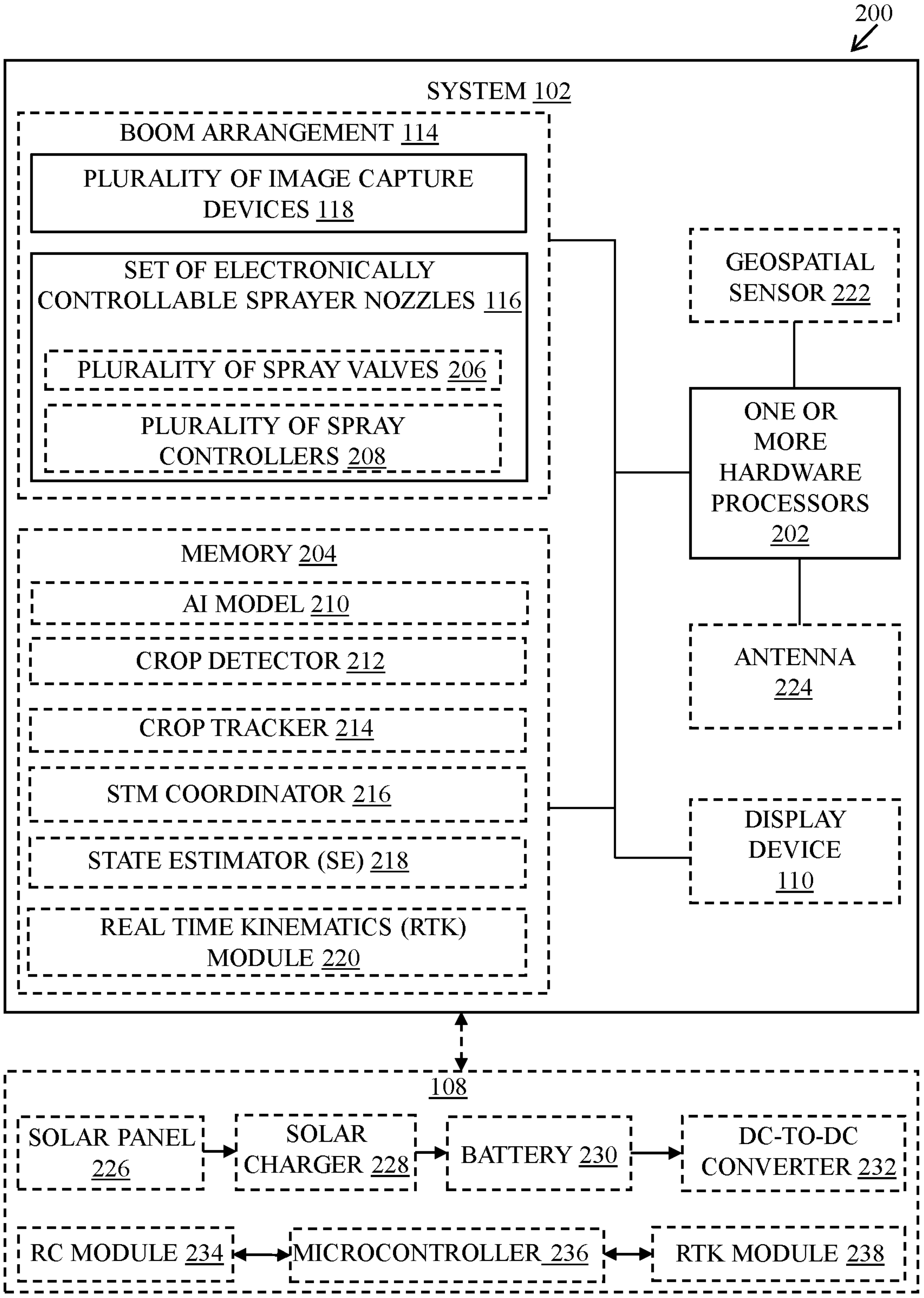
FIG. 2 is a block diagram that illustrates various exemplary components of a system, in accordance with an embodiment of the present disclosure.

FIG. 2 is a block diagram that illustrates various exemplary components of a system, in accordance with an embodiment of the present disclosure. FIG. 2 is described in conjunction with elements of FIGS. 1A and 1B. With reference to FIG. 2, there is shown a block diagram 200 of the system 102 (of FIG. 1) comprising one or more hardware processors 202 and the plurality of image-capture devices 118.

In an implementation, the one or more hardware processors 202 may include one or more graphics processing units (GPU) and a central processing unit (CPU). Examples of each of the one or more hardware processors 202 may include, but are not limited to an integrated circuit, a co-processor, a microprocessor, a microcontroller, a complex instruction set computing (CISC) processor, an application-specific integrated circuit (ASIC) processor, a reduced instruction set (RISC) processor, a very long instruction word (VLIW) processor, a central processing unit (CPU), a state machine, a data processing unit, and other processors or circuits. Moreover, the one or more hardware processors 202 may refer to one or more individual processors, graphics processing devices, a processing unit that is part of a machine.

In operation, the system 102 is mounted in the vehicle 104 for performing enhanced perceptive operations on the agricultural field 106. The system 102 comprises the plurality of image-capture devices 118 that is configured to capture a sequence of colour images corresponding to a plurality of field-of-views (FOVs) of a plurality of defined areas of the agricultural field 106 while the vehicle 104 is in motion. The plurality of FOVs of the plurality of defined areas represents different views (e.g., a look-down view in a specified angle, for example, 45-degree to 90-degree angle) of the areas of the agricultural field 106 that includes the crop plants as well as the weeds. Each of the plurality of image-capture devices 118 captures the sequence of colour images corresponding to the plurality of FOVs of the plurality of defined areas of the agricultural field 106 in order to provide one or more images (i.e., a sequence of colour images) of the crop plants (e.g., cotton plants) and the weeds with high details and information. In an implementation, each of the plurality of image-capture devices 118 may be oriented at a specific angle (e.g., 60°) in order to capture the plurality of defined areas of the agricultural field 106, few metres in forward as well as in downward direction, for example, up to 80-90 cm or up to 1 metre.

In an implementation, each of the plurality of image-capture devices 118 includes an image sensor and a printed circuit board (PCB) that is custom-made. Moreover, the image sensor is configured to capture the sequence of colour images corresponding to the plurality of FOVs of the plurality of defined areas of the agricultural field 106 while the vehicle 104 is in motion. In addition, the PCB includes a plurality of layers of strobe lights and a perforation to accommodate the image sensor. Moreover, each layer of strobe light is distributed on the PCB to surround the image sensor to provide a flashlight in a determined plurality of time instants (e.g., within 3 milliseconds (ms)). The image sensor and the plurality of layers of strobe lights are activated at the determined plurality of time instants to capture the sequence of colour images corresponding to the plurality of FOVs of the plurality of defined areas of the agricultural field 106. The activation and accurate synchronization between the operation of the image-sensor and the plurality of layers of strobe lights is used to capture a non-blurry sequence of colour images with less exposure time (e.g., within 3 ms) and with an improved pixel density. The exposure time is defined as a time span for which the image sensor of plurality of image-capture devices 118 actually exposed to the light so as to record an image. Therefore, such configuration of the PCB reduces the form factor of the plurality of image-capture devices 118 and ensures zero lag in providing adequate power to the various components of the plurality of image-capture devices 118 (e.g., the image sensor, the plurality of layers of strobe lights, and the like).

In conventional systems, the exposure time for camera systems is usually 10-20 milliseconds. However, in the present disclosure, such exposure time is about 2-4 milliseconds, preferably 3 milliseconds, and thus, more high-definition images are quickly captured (i.e., high frequency of image capture) in similar time, say one second, as compared to conventional camera systems. This contributes to nullifying the adverse effects of any jerk or motion artifacts. As result, the sequence of colour images corresponding to the plurality of FOVs of the plurality of defined areas with high frequency is obtained from the plurality of image-capture devices 118 that is beneficial to further detect and track the crop plant in the agricultural field 106.

The system 102 includes the one or more hardware processors 202 that are configured to obtain a sequence of colour images corresponding to the plurality of FOVs from the plurality of image-capture devices 118. In an implementation, the sequence of colour images captured by the plurality of image-capture devices 118 may include one or more images of the agricultural field 106 captured in different environmental conditions, such as a few images are captured in daylight, a few images are captured in evening time, and few are in night-time. Moreover, the sequence of colour images also includes one or more images corresponding to the plurality of FOVs (that includes crop plants and weeds) captured during cloudy or rainy environment. In an implementation, the sequence of colour images captured by the plurality of image-capture devices 118 are stored in a memory 204. The memory 204 may store an operating system, such as a robot operating system (ROS) and/or a computer program product to operate the system 102. A computer readable storage medium for providing a non-transient memory may include, but is not limited to, an electronic storage device, a magnetic storage device, an optical storage device, an electromagnetic storage device, a semiconductor storage device, or any suitable combination of the foregoing.

In an implementation, the system 102 includes the boom arrangement 114. The boom arrangement 114 further comprises the different set of electronically controlled sprayer nozzles 116. The different set of electronically controlled sprayer nozzles 116 are electronically controlled by use of solenoid valves which control the flow (e.g., on, off, pressure and volume) of chemicals through the sprayer nozzles. In an example, the different set of electronically controlled sprayer nozzles 116 of the boom arrangement 114 may be divided into a first set, a second set and a third set in order to spray chemicals on left side, right side, and in front side of the vehicle 104, respectively, when the vehicle 104 is moving across the agricultural field 106. Moreover, there may be a specific distance (e.g., 25 cm) between the plurality of image-capture devices 118 and the different set of electronically controlled sprayer nozzles 116 of the boom arrangement 114. The specific distance can be increased (e.g., increased up to 50 cm) by tilting each of the plurality of image-capture devices 118. The calibration of the specific distance between the plurality of image-capture devices 118 and the different set of electronically controlled sprayer nozzles 116 of the boom arrangement 114 provides a certain time for image processing and switch on the sprayer nozzles. The different set of electronically controlled sprayer nozzles 116 may be placed below the plurality of image-capture devices 118 in order to reduce delay and less time will be consumed in spraying the chemicals. In conventional agricultural systems, it is required to tilt a boom, rotate the boom, retract or fold up a part of the boom, when in operation etc. In contrast to the conventional agricultural systems, there is no such requirement in the boom arrangement 114 of the system 102. The different set of electronically controlled sprayer nozzles 116 further includes a plurality of spray valves 206 and a plurality of spray controllers 208 (e.g., a solenoid). Moreover, each spray valve from the plurality of spray valves 206 is attached to a corresponding sprayer nozzle of the predefined number of electronically controlled sprayer nozzles 116. Further, the one or more hardware processors 202 are configured to send an instruction (e.g., an electrical signal) at a first time instant to at least one spray controller (e.g., a solenoid) from the plurality of spray controllers 208 to activate or deactivate a specific set of spray valves associated with the identified sprayer nozzles.

The one or more hardware processors 202 are configured to determine a health state of a crop plant and a growth state of the crop plant from the obtained sequence of colour images. In an implementation, the health state of the crop plant may be referred to as a biological factor, a chemical factor or a physical factor that may affect the physiology of the crop plant. For example, black spots on the leaves of the crop plant, such as yellow leaves, white powdery blotches, or spots on the leaves of the crop plant and the like. The determination of the health state of the crop plant enables the one or more hardware processors 202 to determine the current health status of the identified crop plant that is used to determine a further course of action for the identified crop plant. For example, if the identified crop plant is a diseased crop plant, then, in that case, the one or more hardware processors 202 are configured to spray a chemical that can cure the diseased crop plant. Similarly, if the identified crop plant is identified as unhealthy or a symptom manifesting from a deficiency of a nutrient is identified, then, in that case, the one or more hardware processors 202 are configured to spray nutrient spray on the identified crop plant.

In another implementation, the growth state of the crop plant may be referred to as an irreversible permanent increase in size of an organ or its parts or even of an individual cell of the crop plant that occurs at the expense of energy. For example, a leaf of a cotton plant may expand after every 10-days, and thus the growth state changes, thus is a factor to be considered in image processing for selection of correct amount of chemical. In an example, the determination of the growth state of the crop plant is used to determine the chemical that can be sprayed on the identified crop plant as different chemicals are required at different growth stages by the crop plants typically. For example, the insecticide sprays are required to be sprayed during the initial phase (first 2-3 months of the plantation) of the cotton plant. Thus, the identification of the crop plant's growth state is used to determine the requirement different chemicals for the crop plant at particular growth state and to increase the overall productivity of the agricultural field 106.

The one or more hardware processors 202 are further configured to extract various features from the captured sequence of colour images. In an implementation, the AI model 210 is used by the one or more hardware processors 202 to detect the health state as well the growth state of the crop plant. The AI model 210 is pre-trained through multiple colour images (e.g., hundreds of images of a cotton plant and other crop plants like chilli and tomato) to capture a holistic view of the crop plant, such as in different locations, different positions (e.g., facing towards sun), different capture timings (e.g., day or night), and at different growth stages (e.g., two-day cotton plant, three-day cotton plant, and the like). In an example, the AI model 210 is used to extract features, such as the type of the crop plant (e.g., a cotton plant, a chilly plant), the age of the crop plant (e.g., the cotton plant of fifteen days), the time of capturing the sequence of colour images (e.g., during day or night or evening), and the weed density in the captured sequence of colour images. An exemplary implementation of the AI model 210 is further shown and described in detail in FIG. 4.

It is observed through experimentation that the conventional agricultural systems do not take into account the growth state and are not reliable. As a result, the conventional agricultural systems either sprays in excess or less than the required chemical on the crop plants or sometimes even misfires the wrong chemical or sprays the chemical at unintended spots in the agricultural field 106, which is not desirable. Therefore, using both the health state and the growth state of the crop plant acts complementary and synergistically with each other and surprisingly improves the reliability of the system 102 to accurately identify the crop plant. Thus, the determination of the health state and the growth state of the identified crop plant is used to train the AI model 210 to accurately distinguish between the crop plants and the weeds and further determine the chemical that is required to be sprayed on the identified crop plant.

In accordance with an embodiment, the determination of the health state of the crop plant from the obtained sequence of colour images includes determining whether the crop plant is a diseased crop plant or a non-diseased crop plant. The diseased crop plant or the non-diseased crop plant can be determined on the basis of the physical appearance of the crop plants, such as yellow leaves, white powdery blotches, or spots on the leaves and the like. The physical appearance of the crop plant is used to extract the features that are used for the determination of the crop plant as diseased crop plant or non-diseased crop plant. For example, the detected cotton plant may have brown leaves, then, in that case, the cotton plant is a diseased crop plant and might be suffering from anthracnose disease. Moreover, the extraction of features from the captured sequence of colour images are performed through the AI model 210 that includes various attributes, such as type of crop plant, age of the crop plant, time of capturing of the sequence of colour images, weed density around the crop plant and the like to detect the diseased and the non-diseased crop plant more accurately. Furthermore, the detected diseased crop plants can be treated, such as by spraying a required chemical on the identified crop plant. Thus, by virtue of determining whether the crop plant is the diseased crop plant or the non-diseased crop plant provides the current status of the crop plant, which is then used to determine the current requirement (e.g., nutrient, fungicide, or which chemical is most suitable etc.) for the identified crop plant.

In accordance with an embodiment, the determination of the health state of the crop plant from the obtained sequence of colour images further includes identifying a foliar discoloration in the crop plant. The foliar discoloration in the crop plant is determined by the one or more hardware processors 202, for example, yellow or dark brown patches on the leaves of the cotton plant. The system 102 is not limited to just identify heath state in terms of diseased and non-diseased plants but moves a step ahead further to identify the foliar discoloration in the crop plant, which in turn enables the system 102 to detect the crop plant even with foliar discoloration that requires immediate attention. Moreover, such determination at early stage also prevents the spreading of a disease from the diseased crop plant to a healthy crop plant.

In accordance with an embodiment, the determination of the growth state of the crop plant from the obtained sequence of colour images includes determining a canopy of growth of the crop plant. The canopy refers to an above-ground portion of the crop plant formed by the collection of individual crop plant crowns. The determination of the canopy of the growth of the crop plant is used to distinguish between the area covered by the crop plant and the area covered by the weeds. Thus, the determination of the canopy of growth of the crop plant improves the accuracy and reliability in the determination of the growth state of the crop plant. In accordance with an embodiment, the determination of the growth state of the crop plant from the obtained sequence of colour images comprises determining a crown of the crop plant. The crown of the crop plant corresponds to the crown of a crop plant refers to a total of an individual plant's aboveground parts, including stems, leaves, and reproductive structures. Thus, the determination of the canopy of growth of the crop plant and even the individual crowns further improve the accuracy and reliability in the determination of the growth state of the crop plant unlike conventional systems, which do not take into account the granularity to the extent of the crown and canopy of crop plants.

In an implementation, the sequence of colour images is processed by using an AI model 210 which further leads to more accurate differentiation between crop plants and weeds in different environmental conditions and enables the boom arrangement 114 of the system 102 to perform an efficient and effective chemical spraying in the agricultural field 106. The AI model 210 enables the plurality of image-capture devices 118 to capture high-quality, jerk-free or motion artifact-free images of the agricultural field 106 despite of variation in the environmental parameters (i.e., variation in sunlight due to either clouds or rain or shadow of a large object). Furthermore, depending upon the type of the crop plant, the one or more hardware processors 202 are configured to extract the features, such as the height of the crop plant, colour of the leaves, and the like through the AI model 210. Therefore, the AI model 210 is pre-trained and enables the system 102 to clearly differentiate between two green looking objects (e.g., crop plants and weeds) and results in a controlled and perceptive spraying of chemicals on the crop plants. Alternatively stated, the AI model 210 determines the treatment that is required by different crop plants at different growth states (e.g., insecticides are sprayed on the cotton plants with more than 2-3 months of age) that enhances the accuracy and efficiency of the system 102. In an example, the AI model 210 is pre-trained to distinguish the crop plant based on the various attributes, such as the type of crop plant, age of the crop plant, time of capturing, lightings, weed density, soil condition, region, location, and the season in which the crop plant is grown without affecting the scope of the present disclosure. Additionally, the AI model 210 is further pre-trained to detect the crop plants in the agricultural field 106 with complex environmental surroundings, such as folded leaf, wind, drooping leaves, occlusion by wing, too small plant, defocused captured image, and the like. In an implementation, the AI model 210 may be stored in the memory 204. In another implementation, the AI model 210 may be disposed outside the memory 204 as a sperate module or circuitry and communicatively coupled to the memory 204.

The one or more hardware processors 202 are configured to determine and dynamically select a spray mode from a predefined list of spray modes based on the determined health state of the crop plant, the growth state of the crop plant, and a type of chemical to be sprayed while the vehicle 104 is in motion. As result, the one or more hardware processors 202 are configured to spray the chemical on the detected crop plant according to the requirement of the crop plant. For example, a 3-4 months of cotton plant is not grown fully and thus, require a nutrient spray. In accordance with an embodiment, the predefined list of spray modes includes a perceptive spot spray mode, a herbicide spray mode, a pesticide spray mode, a diseased-plant spray mode, a nutrient spray mode, a blanket spray mode, an all-green spray mode, a foliar discoloration spray mode, or a combinatorial spray mode in which any two or more spray modes are concomitantly selected. For example, if the detected crop plant is a diseased crop plant, then in that case, the one or more hardware processors 202 are configured to select a diseased plant spray mode. Similarly, the one or more hardware processors 202 are configured to select the nutrient spray mode for the crop plants that are not grown properly. Thus, the system 102 provides new modes that can be employed to increase perceptibility and efficiency of operation of the system 102. For example, the perceptive spot spray mode not only takes into account the determined health state of the crop plant, but also the growth state of the crop plant, and the type of chemical to be sprayed while the vehicle 104 is in motion and at the same time is able to handle change in the surrounding environmental conditions while capturing images of agricultural field 106. Similarly, the foliar discoloration spray mode allows enables the system 102 to detect the crop plant even with foliar discoloration. Advantageously, the combinatorial spray mode in which any two or more spray modes are concomitantly selected improves the productivity rate, by about 30-50%.

In accordance with an embodiment, the one or more hardware processors 202 are further configured to distinguish crop plants from weeds based on the obtained sequence of colour images. Firstly, the image-capture devices 118 is configured to obtain the sequence of colour images. Thereafter, the AI model 210 from the one or more hardware processors 202 is pre-trained to detect the crop plants in the agricultural field 106 with complex environmental surroundings, such as folded leaf, wind, drooping leaves, occlusion by wing, too small plant, defocused captured image, high weed density, and the like. After that, the one or more hardware processors 202 are configured to control the predefined number of the electronically controlled sprayer nozzles to concomitantly spray a first type of chemical exclusively over the weeds and a second type of chemical exclusively over the crop plants. For example, the one or more hardware processors 202 detects the crop plant, then, in that case, the one or more hardware processors 202 are configured to spray the second type of chemical, such as herbicide, insecticide, pesticide, and the like on the detected crop plant. Similarly, if the one or more hardware processors 202 detects the weeds, then, in that case, the one or more hardware processors 202 are configured to spray the first type of chemical, such as weedicide on the detected weed. Moreover, the predefined number of the electronically controlled sprayer nozzles are selected based on the detected plant, such as the crop plant or the weeds to concomitantly spray a first type of chemical exclusively over the weeds and a second type of chemical exclusively over the crop plants accurately. Thus, two different types of chemicals may be released concomitantly improving the rate of operation of the system 102 by almost 50% without any compromise in coverage of crop plants. Further, the wastage of energy in operation of system 102 is reduced, which otherwise would require to perform same operation twice.

In an implementation, the system 102 includes a crop tracker 214 and a crop detector 212. The crop detector 212 is configured to detect a crop plant and the crop tracker 214 that is configured to track location of each crop from the captured sequence of colour images. In an example, the crop detector 212 and the crop tracker 214 can be implemented in a hardware circuitry. In another example, the crop detector 212 and the crop tracker 214 may be implemented as functions or logic stored in the memory 204. In an implementation, the memory 204 further includes a STM coordinator 216, a state estimator (SE) 218, and a real time kinematics (RTK) module 220. In an example, each of the STM coordinator 216, SE 218, and the RTK module can be implemented in a hardware circuitry or logic. The STM coordinator 216 is configured to coordinate between the crop detector 212, the crop tracker 214, and the AI model 210 to process the captured sequence of coloured images. Moreover, the SE 218 works in coordination with the RTK module 220 that is configured to process positioning details of the crop plants and weeds from the captured images with improved accuracy. In an example, the SE 218 is configured to receive data related to position of the crop plants and the weeds from the RTK module 220. In addition, the SE 218 is configured to receive freewheel odometry values from the vehicle 104 and provide a fused odometry output that is published in the memory 204 and used by the crop tracker 214 to track positions of the crop plants and weeds.

The one or more hardware processors 202 are further configured to receive geospatial location correction data from the external device 108 placed at a fixed location in the agricultural field 106 and geospatial location coordinates associated with the boom arrangement 114 mounted on the vehicle 104. In an example, the geospatial location coordinates associated with the boom arrangement 114 are obtained based on a geospatial sensor 222 arranged in the boom arrangement, for example, on a printed circuit board (PCB) where the one or more hardware processors 202 are disposed. In an implementation, the external device 108 may also be referred to as a real-time kinematics global positioning system (RTKGPS) module. The external device 108 is configured to provide the geospatial location correction data that means exact location of the vehicle 104 with error correction data in the agricultural field 106 when the vehicle 104 is moving at a specific range of speed across the agricultural field 106. Moreover, the external device 108 provides the geospatial location coordinates of the boom arrangement 114 that is mounted on the vehicle 104. In conventional agricultural systems, a GPS module is located inside a vehicle which provides location data of the vehicle. It is observed during experimentation that by virtue of locating the GPS module inside the vehicle, there is error in location accuracy of the vehicle. In contrast to the conventional agricultural systems, the external device 108 provides not only the exact location but also the error correction data. Additionally, the external device 108 provides geospatial location coordinates of the boom arrangement 114 that mounts the plurality of image-capture devices 118, the predefined number of the electronically controlled sprayer nozzles 116, and the one or more hardware processors 202 so that there is no delay in processing of data with high location accuracy (e.g., accuracy in centimetres, cm) can be achieved.

In an implementation, the external device 108 is setup on a tripod. Moreover, the external device 108 includes a solar panel 226, a solar charger 228, a battery 230, a DC-to-DC converter 232, a Remote Control (RC) module 234, a microcontroller 236, and a RTK module 238. The solar panel 226 is configured to be removably and electrically coupled to the external device 108. The solar panel 226 is further configured to capture solar energy and convert into electric energy, which is further stored in the battery 230 that is electrically coupled to the solar panel 226. Thereafter, the DC-to-DC converter 232 is configured to convert an output of the battery 230 from one voltage level to another, such as to provide a desired voltage to the RC module 234. In an example, the RC module 234 is configured to work with a specified frequency, for example, a 2.4 Giga Hertz or at other frequency value without limiting the scope of the disclosure. In addition, the microcontroller 236 is communicatively coupled with the RC module 234 as well as with the RTK module 238, for example through a universal asynchronous receiver-transmitter (UART). The microcontroller 236 is configured to control the RC module 234 and the RTK module 220, such as to ensure that the system is within a desired from the external device 108. For example, the RC module 234 and the RTK module 220 are configured to receive from an antenna 224 of the system 102.

In an implementation, the one or more hardware processors 202 are configured to execute mapping of pixel data of weeds or a crop plant in an image to distance information from a reference position of the boom arrangement 114 when the vehicle 104 is in motion. In contrast to conventional agricultural systems, the one or more hardware processors 202 of the system 102 are configured to map pixel level data of weeds or the crop plant in the image to distance information to achieve high accuracy. The distance information signifies the information about the location of weeds and the crop plant from the reference position of the boom arrangement 114 when the vehicle 104 is in motion. That means, how far and in which direction the weeds and the crop plant is located in the agricultural field 106 from the reference position of the boom arrangement 114. Each pixel of the image is mapped to the distance information in millimetres (mm), for example, 1 pixel to 3 mm on real ground, pixel per mm mapping is performed. The mapping of the image depends on a certain threshold value. If the threshold value is different then, mapping of the image will be different. In an implementation, a sub-pixel (or a virtual pixel) of each pixel of the image can be considered to achieve more accuracy.

In an example, in order to execute the mapping, each of the plurality of image-capture devices 118 positioned above the different set of electronically controlled sprayer nozzles 116, captures an image frame of the ground (i.e., the agricultural field 106) with crop plants and weeds. From this image frame, the one or more hardware processors 202 are configured to map each crop plants/weeds in a coordinate, where the location correction data (RTK GPS) provides geolocation of the image frame. Using the image frame and the geolocation, a precise geolocation of each crop plant and/or weeds can be determined up to a precision of +/−2.5 cm. Now that the different set of electronically controlled sprayer nozzles 116 may be "X" distance away from at least one of the plurality of image-capture devices 118. Thus, the system 102 waits until one or more electronically controllable sprayer nozzles reaches the geolocation or geocoordinates of the crop pant to initiate spraying of a defined chemical. The boom orientation sensor data, boom height data, and camera orientation data are fused with the image frame and the geolocation of the image frame to derive accurate coordinate of each crop plant and weeds to precisely and perceptively spray on each crop plant (or weed if so desired).

The one or more hardware processors 202 are further configured to automatically operate a different set of electronically controlled sprayer nozzles 116 at different time instants to release the selected type of chemical from a predefined number of the electronically controlled sprayer nozzles based on the selected spray mode while the vehicle 104 is in motion at different time instants. This confers a technical effect of very accurate coverage of chemical in accordance with the growth state of the crop plant. For example, for 10-day crop and 1 month crop plant, there will be different growth stage, which the system can identify and accordingly re-calibrate its operations to mitigate unwanted losses in chemical usage as well as correct coverage of whole crop plant. The synergistic combination of the use of the health state of the crop plant, the growth state of the crop plant, and a type of chemical to be sprayed makes the system fail-safe and improves the automatic operation of the different set of electronically controlled sprayer nozzles at different time instants.

In accordance with an embodiment, the different set of electronically controlled sprayer nozzles 116 are operated automatically to release two different types of chemicals concurrently when two different categories of crop plants are identified. For example, one or more hardware processors 202 are configured to automatically operate a first and last set of electronically controlled sprayer nozzles after every 3 seconds to release the nutrient chemical while the vehicle 104 is in motion. Similarly, one or more hardware processors 202 are configured to automatically operate a fourth and fifth set of electronically controlled sprayer nozzles after every 3 seconds to release the fungicide on the diseased crop plant while the vehicle 104 is in motion. As a result of the improved perceptive ability of the system 102, the system 102 is able to operate and control the different set of electronically controlled sprayer nozzles 116 to release two different types of chemicals concurrently when two different categories of crop plants (e.g., diseased and non-diseased; healthy crops and crops with foliar discolouration; crop plants with different growth states etc) are identified.

In accordance with an embodiment, the different set of electronically controlled sprayer nozzles 116 are operated to release two or more different types of chemicals concurrently or alternatively when two or more different categories of crop plants and different categories of weeds are identified. The release of two or more different type of chemicals concurrently or alternatively. As a result of the improved perceptive ability of the system, the system is able to operate and control the different set of electronically controlled sprayer nozzles either concurrently or alternatively as per user choice. Moreover, such operation enables the system to behave differently for different type of crop plants and weeds that overall increases the productivity of the system 102 in the agricultural field 106.

In an implementation, the predefined set of electronically controllable sprayer nozzles from amongst the different set of electronically controlled sprayer nozzles 116 are configured to operate based on a defined confidence threshold and the executed mapping of pixel data, where the defined confidence threshold is indicative of a detection sensitivity of the crop plant. In an implementation, the specific set of electronically controllable sprayer nozzles from amongst the different set of electronically controlled sprayer nozzles 116 can be operated either automatically by virtue of the one or more hardware processors 202 or manually, depending on requirement. The operation of the different set of electronically controlled sprayer nozzles 116 depends on the defined confidence threshold and the executed mapping of pixel data. The defined confidence threshold is the threshold value of the AI model 210. The defined confidence threshold is adaptive in real time or can be set manually by use of a user interface (UI) of the custom application 112 via the display device 110 (of FIG. 1). In a case, if the defined confidence threshold increases, the detection sensitivity of the crop plant increases. By virtue of the defined confidence threshold, the system 102 itself detects whether a plant is suffering from a disease, discolouration, or not. The use of the defined confidence threshold is described in further detail, for example, in FIG. 6.

In an implementation, the one or more hardware processors 202 are further configured to determine a height of a tallest crop plant from among a plurality of crop plants from a ground plane in the agricultural field 106 and set a boom height from the ground plane based on the determined height of the tallest crop plant. In an example, the system 102 further includes an ultraviolet sensor that is used by the plurality of image-capture devices 118 to determine the height of the crop plant from the ground level. The height of the tallest crop plant from among the plurality of crop plants is determined from the ground plane in the agricultural field 106. The reason of determining the height of the tallest crop plant from among the plurality of crop plants is to include each and every crop with a height lying in a range of smallest to the tallest crop plant. Furthermore, the one or more processors are configured to set the boom height of the boom arrangement 114 from the ground plane based on the determined height of the tallest crop plant.

In an implementation, the one or more hardware processors 202 are further configured to determine an upcoming time slot to spray a chemical based on the executed mapping of the pixel data, the defined confidence threshold, and the set boom height. In an implementation, the upcoming time slot may be referred to as a time period (or a time window) which is required to spray the chemical either on the crop plant or on weeds based on the executed mapping of the pixel data, the defined confidence threshold, and the set boom height. For example, 500 to 800 milliseconds (msec) may be required to spray the chemical on the crop plant or on the weeds. The time period of 500 to 800 msec is referred to as the upcoming time slot. By use of the executed mapping of the pixel data, the defined confidence threshold, and the set boom height, the chemical is sprayed either on the crop plant or on weeds in a controlled amount as well. In an implementation, the chemical may be sprayed on the crop plant in order to either protect the crop plant from disease or to promote the growth of the crop plant. In another implementation, the chemical may be sprayed on the weeds for weed management.

In an implementation, the determining of the upcoming time slot to spray the chemical is further based on a size of the crop plant occupied in a two-dimensional space in x and y coordinate direction. The determination of the upcoming time slot (or the time period) to spray the chemical the crop plant is based on the size of the crop plant in the two-dimensional space in the x and y coordinate direction. In an implementation, the x coordinate direction indicates the direction of motion of the vehicle 104 and y coordinate direction indicates the height of the crop plant.

In an implementation, the one or more hardware processors 202 are further configured to determine one or more regions in the agricultural field 106 where to spray a chemical based on the executed mapping of pixel data and the defined confidence threshold. Currently, the operations of conventional agricultural systems is based on proper demarcation of an agricultural field. In other words, row identification and row-based processing forms an indispensable component of the conventional agricultural systems. Therefore, the conventional agricultural systems fail when used in the agricultural field where there is no proper demarcation of rows, like in India and many other countries. In contrast to the conventional agricultural systems, the system 102 is applicable on both that is, row based agricultural fields or non-row based agricultural fields. The one or more hardware processors 202 of the system 102 are configured to determine the one or more regions of the agricultural field 106 where to intelligently spray the chemical based on the executed mapping of pixel data and the defined confidence threshold.

In an implementation, the specific set of electronically controllable sprayer nozzles from amongst the different set of electronically controlled sprayer nozzles 116 are caused to operate specifically at the determined one or more regions in the agricultural field 106 for a first time slot that corresponds to the determined upcoming time slot. After determination of the one or more regions (i.e., either row based or non-row based) in the agricultural field 106 where there is requirement to spray the chemical, the specific set of electronically controllable sprayer nozzles from amongst the different set of electronically controlled sprayer nozzles 116 are caused to operate for the first time slot that corresponds to the determined upcoming time slot (i.e., the time period). The specific set of electronically controllable sprayer nozzles may include either the first set or the second set or the third set in order to spray the chemicals either on the left side, or the right side, or in the front side of the vehicle 104, respectively, when the vehicle 104 is moving across the agricultural field 106. The operation of the specific set of the electronically controllable sprayer nozzles from amongst the different set of electronically controlled sprayer nozzles 116 is described in further detail, for example, in FIGS. 7A and 7B.

In an implementation, the one or more hardware processors are further configured to control an amount of spray of a chemical for the first time slot from each of the specific set of electronically controllable sprayer nozzles by regulating an extent of opening of a valve associated with each of the specific set of electronically controllable sprayer nozzles. Since each of the specific set of electronically controllable sprayer nozzles is electronically controlled by use of the valve (e.g., solenoid valve) therefore, by regulating the extent of opening of the valve, the amount of spray of the chemical can be controlled for the first time slot.

In another implementation, the one or more hardware processors 202 are further configured to communicate control signals to operate a plurality of different sets of electronically controlled sprayer nozzles at different time instants during a spray session. In order to regulate the operation of the different set of electronically controlled sprayer nozzles 116, the one or more hardware processors 202 are configured to communicate the control signals (e.g., clock signals) to operate the plurality of different sets of electronically controlled sprayer nozzles at different time instants during the spray session.

In an implementation, the one or more hardware processors 202 are further configured to receive a user input, via the custom application 112 rendered on the display device 110. Moreover, the user input corresponds to a user-directed disablement, or an enablement of one or more electronically controllable nozzles to override an automatic activation and deactivation of the one or more electronically controllable nozzles during a spray session. In an implementation, when a user moves the vehicle 104 across the agricultural field 106 then, the user may provide the user input through the custom application 112 rendered on the display device 110. The display device 110 may be used in form of either a tablet or a smart phone which is installed on one side of the vehicle 104. The user provides the user input either for deactivating or activating the one or more electronically controllable nozzles to stop or operating, respectively, the one or more electronically controllable nozzles during the spray session. An implementation scenario of the user-directed disablement, or the enablement of one or more electronically controllable nozzles to override the automatic activation and deactivation of the one or more electronically controllable nozzles during the spray session is described in detail, for example, in FIG. 7B.

Thus, the disclosed system 102 is technically advanced in terms of its perceptive ability and is intelligent enough to adapt to uneven agricultural land, is astutely perceptive to real-time changes in the surrounding environmental conditions, and not dependent on any row-identification. For example, in conventional systems, if crops are planted in proper rows and columns in an agricultural field, then only camera-assisted or camera-aided machines can function in real-world conditions. Unlike the conventional systems, the disclosed system 102 of the present invention does not need any prior plantation format to be followed. The determination of the health state and the growth state of the identified crop plant is used to train an AI model 210 to accurately distinguish between the crop plants and the weeds and further determine the chemical that is required to be sprayed on the identified crop plant. system as a whole, is able to handle surrounding environmental conditions, such as variation in sunlight due to either cloud, rain, a shadow of a large object, like tree, while capturing an image, change in position of sun throughout the day, light intensity, a time of day when the system is operated etc.) and at the same time is able to capture non-blurry images. This in turn improves the subsequent operations of the system 102 and imparts a perceptive ability to adapt to uneven agricultural land and handle surprisingly advanced real-time changes in the surrounding environmental conditions, such as change in shape of leaves due to wind, drooping of leaves, occlusion by weed, high weed density around the crop plants, and the like.

Furthermore, in the disclosed system 102, the one or more hardware processors 202 are configured to determine and dynamically select a spray mode from a predefined list of spray modes based on the determined health state of the crop plant, the growth state of the crop plant, and a type of chemical to be sprayed while the vehicle 104 is in motion and automatically operate a different set of electronically controlled sprayer nozzles 116 at different time instants. This confers a technical effect of very accurate coverage of chemical in accordance with the growth state of the crop plant. For example, for 10-day crop and 1 month crop plant, there will be different growth stage, which the system 102 can identify and accordingly re-calibrate its operations to mitigate unwanted losses in chemical usage as well as correct coverage of whole crop plant. The synergistic combination of the use of the health state of the crop plant, the growth state of the crop plant, and a type of chemical to be sprayed makes the system 102 fail-safe and improves the automatic operation of the different set of electronically controlled sprayer nozzles 116 at different time instants.

Figure 3A:
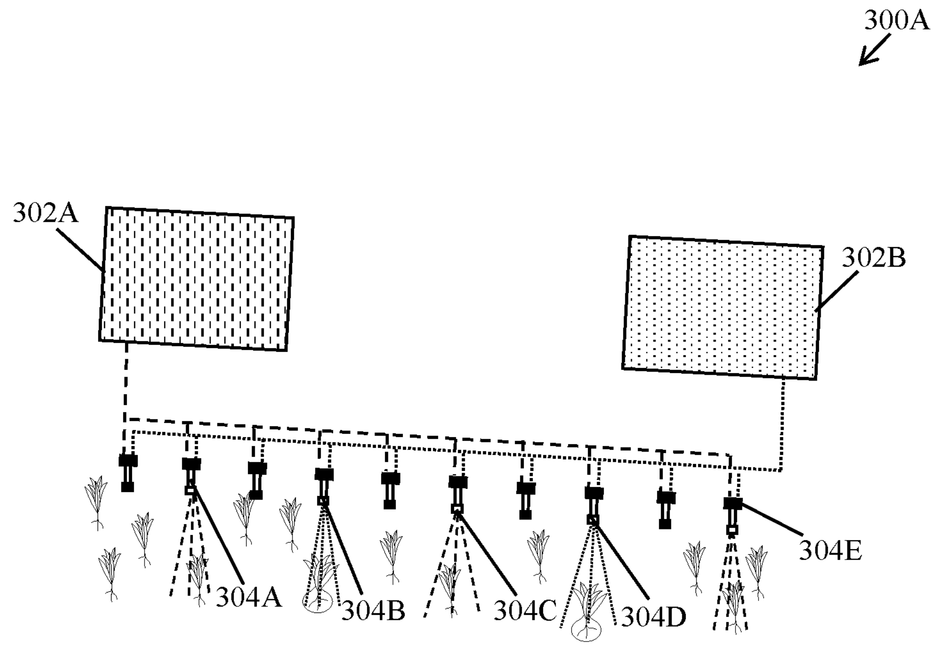
FIG. 3A is a diagram that illustrates an exemplary scenario of operation of a different set of electronically controlled sprayer nozzles, in accordance with an embodiment of the present disclosure.

FIG. 3A is a diagram that illustrates an exemplary scenario of operation of a different set of electronically controlled sprayer nozzles, in accordance with an embodiment of the present disclosure. FIG. 3A is described in conjunction with elements from FIGS. 1A, 1B, and 2. With reference to FIG. 3A, there is shown an exemplary scenario 300A that illustrates the operation of the different set of electronically controlled sprayer nozzles 116.

The different set of electronically controlled sprayer nozzles 116 are operated to release two or more different types of chemicals concurrently when two or more different categories of crop plants and different categories of weeds are identified. The system 102 includes two separate chemical tanks, for example, a first chemical tank 302A contains weedicide and a second chemical tank 302B contains pesticide. The activation of the different set of electronically controlled sprayer nozzles 116 is based on the distance between the identified different category of the crop plant and/or different category of weeds and the boom arrangement 114. Moreover, the different set of electronically controlled sprayer nozzles 116 are activated to release two or more different type of chemicals concurrently based on the category of the identified crop plant/weeds. Moreover, the one or more hardware processors 202 are configured to control one or more electronically controlled sprayer nozzles from the different set of electronically controlled sprayer nozzles 116 while the vehicle 104 is in motion. For example, the one or more hardware processors 202 are configured to operate an electronically controlled sprayer nozzle 304A, an electronically controlled sprayer nozzle 304B, and an electronically controlled sprayer nozzle 304C to release weedicide on the weeds from the first chemical tank 302A while the vehicle 104 is in motion, as shown in FIG. 3A. In addition, an electronically controlled sprayer nozzle 304D and an electronically controlled sprayer nozzle 304E releases pesticide from the second chemical tank 302B as the diseased crop plants are identified by the one or more hardware processors 202 as shown in FIG. 3A. Thus, two different types of chemicals may be released concomitantly by improving the rate of operation of the system 102 by almost 50% without any compromise in coverage of crop plants. Further, the wastage of energy in operation of system is reduced, which otherwise would require to perform same operation twice.

Figure 3B:
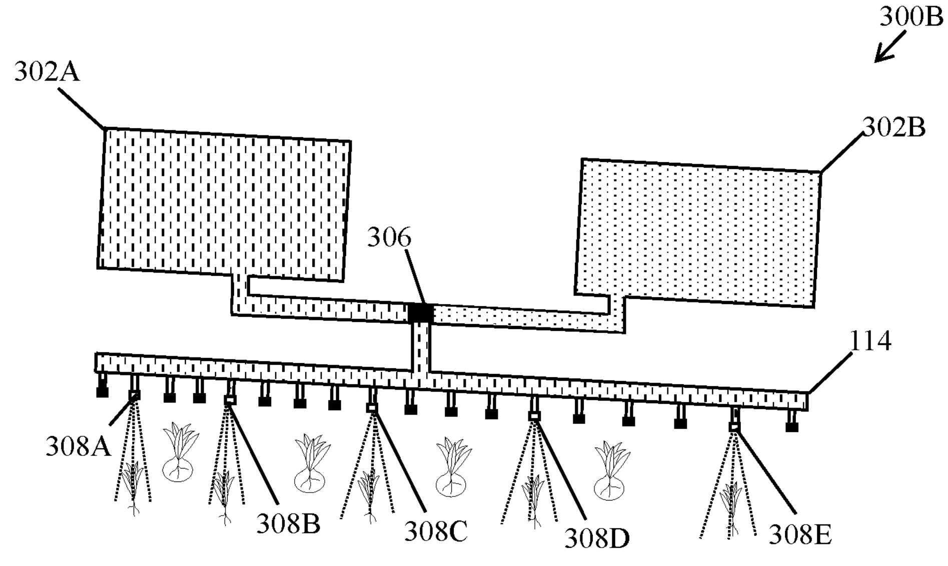
FIG. 3B is a diagram that illustrates another exemplary scenario of operation of a different set of electronically controlled sprayer nozzles, in accordance with an embodiment of the present disclosure.

FIG. 3B is a diagram that illustrates an exemplary scenario of another operation of a different set of electronically controlled sprayer nozzles, in accordance with an embodiment of the present disclosure. FIG. 3B is described in conjunction with elements from FIGS. 1A, 1B, and 2. With reference to FIG. 3B, there is shown another exemplary scenario 300B that illustrates another operation of the different set of electronically controlled sprayer nozzles 116.

The different set of electronically controlled sprayer nozzles 116 are operated to release two or more different types of chemicals alternatively when two or more different categories of crop plants and different categories of weeds are identified. The system 102 contains two separate chemicals in two different chemical tanks, such as the first chemical tank 302A contains weedicide and the second chemical tank 302B contains pesticide. Furthermore, a spray valve 306 is attached with the pipe that connects both the chemical tanks (i.e., the first chemical tank 302A and the second chemical tank 302B) and the boom arrangement 114 to allow only one chemical to flow through the pipe to the boom arrangement 114 at one time. For example, an electronically controlled sprayer nozzle 308A, an electronically controlled sprayer nozzle 308B, an electronically controlled sprayer nozzle 308C, an electronically controlled sprayer nozzle 308D, and an electronically controlled sprayer nozzle 308E are operated automatically to release weedicide from the first chemical tank 302A as the weeds are identified by the one or more hardware processors 202 while the vehicle 104 is in motion, as shown in FIG. 3B. Similarly, the different set of electronically controlled sprayer nozzles 116 are operated automatically to release the pesticide alternatively when the crop plant is identified by the one or more hardware processors 202. As a result, the improved perceptive ability of the system 102 is achieved. Thus, the system 102 is able to operate and control the different set of electronically controlled sprayer nozzles 116 alternatively as per user's choice. Moreover, such operation enables the system 102 to behave differently for different type of crop plants and weeds that overall increases the productivity of the system 102 in the agricultural field 106.

Figure 4:
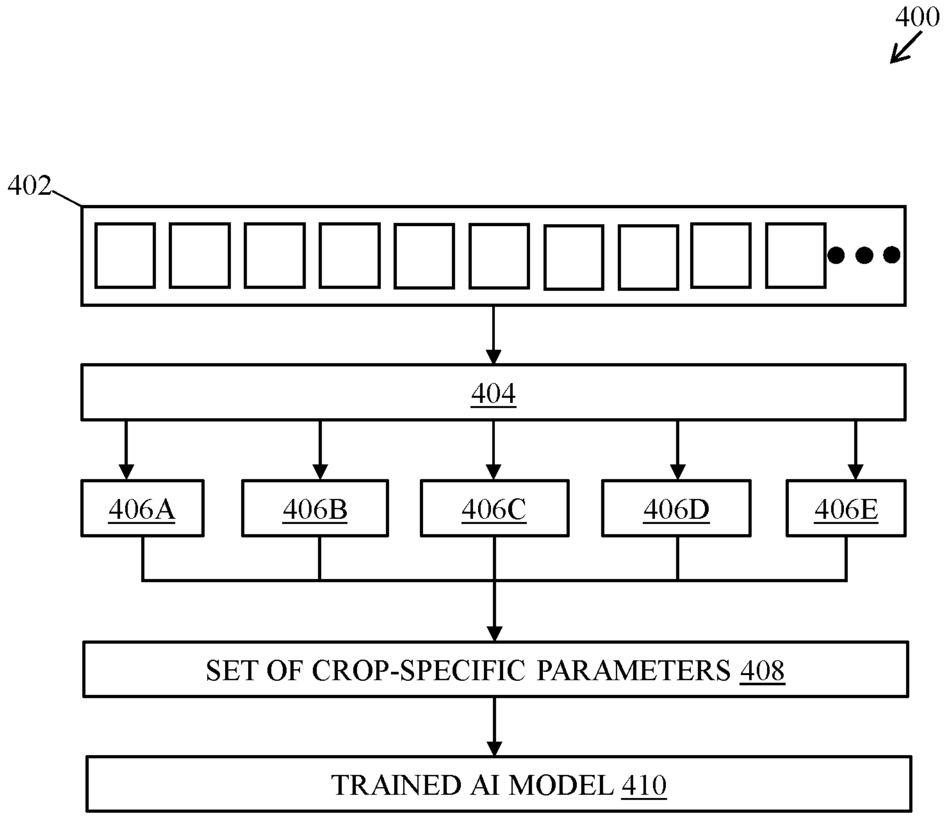
FIG. 4 is a diagram that illustrates an exemplary scenario of training of an artificial intelligence (AI) model, in accordance with an embodiment of the present disclosure.

FIG. 4 is a diagram that illustrates an exemplary scenario of training of an artificial intelligence (AI) model, in accordance with an embodiment of the present disclosure. FIG. 4 is described in conjunction with elements from FIGS. 1A, 1B, 2, 3A, and 3B. With reference to FIG. 4, there is shown an exemplary scenario 400 that illustrates the training of the AI model 210 (of FIG. 2). With reference to FIG. 4, there is shown a diagram that includes a series of operations from 402 to 410 to train the AI model 210 (of FIG. 2). The one or more hardware processors 202 (of FIG. 2) are configured to execute the operations shown in the diagram.

In the training phase, thousands of different images (e.g., images of a cotton plants) to capture a holistic view of the crop plant, such as in different locations, different positions (e.g., towards the sun), at different time of day (e.g., early morning, evening or night), and at different growth stages (e.g., two-day cotton plant, three-day cotton plant), and different heath state are used to train the AI model 210.

At operation 402, the one or more hardware processors 202 are configured to obtain the captured sequence of colour images corresponding to the plurality of FOVs of the plurality of defined areas of the agricultural field 106 while the vehicle 104 is in motion. Thereafter, at operation 404, the one or more hardware processors 202 are configured to extract features from the captured sequence of colour images corresponding to the plurality of FOVs of the plurality of defined areas of the agricultural field 106 to form a training dataset for the AI model 210. The training dataset for the AI model 210 corresponds to a training dataset that is very personalised and created to train the AI model 210 based on the extracted features, such as the features extracted at operation 406A to operation 406E to pre-train the AI model 210 for the determination of the health state and the growth state of the crop plant.

At operation 406A, the one or more hardware processors 202 are configured to extract a morphological feature indicative of a type of the crop plant, such as a cotton plant, a chilly plant, and the like. Similarly, at operation 406B, the one or more hardware processors 202 are configured to extract a size pattern for an overall plant and/or a shape pattern leaves that is indicative of an age of the crop plant (e.g., fifteen days, 30 days, and the like). The age of the crop plant is used to further identify the chemical spray during the execution phase that can be sprayed on the crop plant to improve the growth rate of the crop plant. Moreover, the age of the crop plant is used to identify if the crop plant is eligible for tolerating a certain chemical spray or not, for example, the fifteen-day cotton plant may die due to the spray of a fungicide in the execution phase once the AI model 210 is trained. Thus, the fungicide may not be sprayed over the fifteen-day cotton plant. Furthermore, at operation 406C, the one or more hardware processors 202 are configured to timestamp the captured images indicative of a time of capture of the sequence of colour images (i.e., or a time of day) corresponding to the plurality of FOVs of the defined area of the agricultural field 106. The colour displayed in the captured sequence of colour images may vary due to the rain, shadow, sunlight or any other such environmental surroundings. Thus, the time of capture improves the perceptive ability in the execution phase to distinguish between the actual colour of the crop plant and any colour which is not natural and may be likely due to external environmental conditions, such as shadow, cloud, rain, time of day etc. Furthermore, at operation 406D, the one or more hardware processors 202 are configured to extract a weed pattern from the captured sequence of colour images indicative of a weed density around a crop plant. In certain scenarios, due to high weed density, the leaves of the weeds occlude the leaves of the identified crop plant. Therefore, the AI model 210 is trained to distinguish between the area covered by the crop plant and the weeds to prevent false detection of the crop plant, such as due to occlusion of the leaves of the weeds on the leaves of crop plant in the execution phase. Furthermore, at operation 406E, the one or more hardware processors 202 are configured to extract a location from metadata associated with the captured sequence of colour images. The location of the captured sequence of colour images is used to identify the local location of the agricultural field 106 that is further used to identify the climatic conditions and the soil conditions of the agricultural field 106 in the execution phase. For example, if the cotton plant is grown in a black soil, then, in such case, the cotton plant does not require any nutrient chemical spray. However, if the cotton plant is grown in any other soil, then, in such case, the cotton plant may require any nutrient chemical spray.

At operation 408, the one or more hardware processors 202 are configured to determine a set of crop-specific parameters, such as the parameters determined through operations 406A to 406E. The determination of the set of crop-specific parameters are used to detect and track the crop plant by determining the health state and the growth state of the crop plant from the captured sequence of colour images corresponding to the plurality of the FOVs of the defined area of the agricultural field 106. Finally, at operation 410, a trained AI model 210 is obtained, which is used by the one or more hardware processors 202 to detect and track the crop plant with high accuracy from the captured sequence of colour images corresponding to the plurality of FOVs of the defined area of the agricultural field 106.

Thus, the trained AI model 210 to determine the health state and the growth state of the crop plant, such as through the extracted set of crop-specific parameters, with increased accuracy and reliability. As result, the system 102 is configured to prevent excess spraying or less spraying as compared to the required chemical spraying on the crop plant. Additionally, the pre-training of the AI model 210 is also used to prevent misfiring of the wrong chemical sprays of the chemical at unintended spots in the agricultural field 106. Furthermore, the AI model 210 may also be used to analyse the extracted parameters from captured sequence of colour images to predict an overall productivity of the agricultural field 106. In such case, the prediction of the overall productivity of the agricultural field 106 is beneficial for a user to decide further course of action. For example, if the analysed data represents that 70-80% of the total identified crop plants in the agricultural field 106 is suffering from a fungus disease. In such case, the user may spray the chemical, such as a fungicide to prevent such fungus diseases in advance by spraying such chemical more frequently than the other chemicals on the crop plants of the agricultural field 106.

Figure 5:
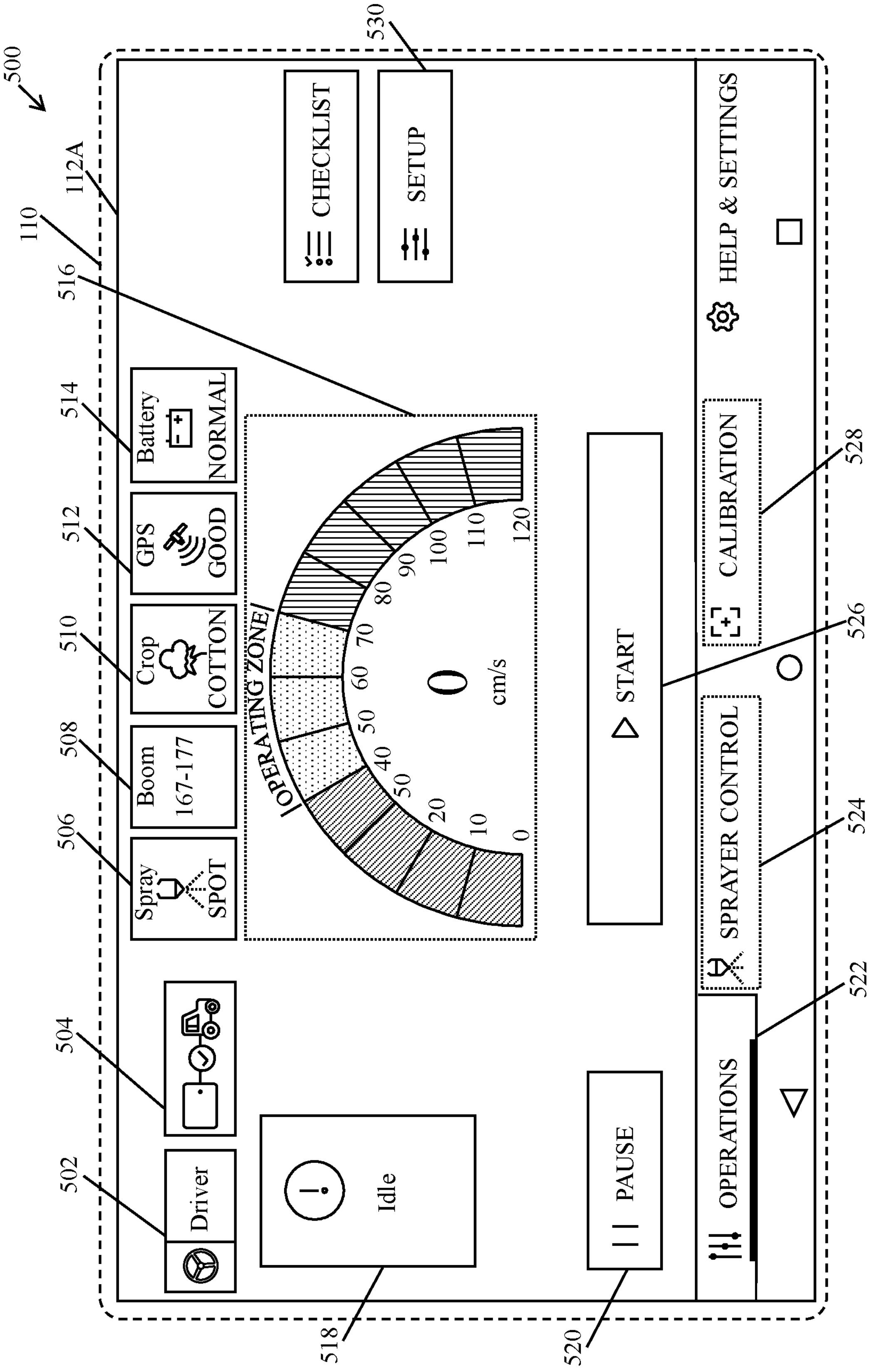
FIG. 5 is a diagram that illustrates an exemplary scenario of an operating zone of a vehicle, in accordance with an embodiment of the present disclosure.

FIG. 5 is a diagram that illustrates an exemplary scenario of an operating zone of a vehicle, in accordance with an embodiment of the present disclosure. FIG. 5 is described in conjunction with elements from FIGS. 1A, 1B, 2, 3A, 3B, and 4. With reference to FIG. 5, there is shown an exemplary scenario 300 that illustrates the operating zone of the vehicle 104 (of FIG. 1) via a UI 112A rendered on the display device 110. There is further shown different UI elements, such as UI elements 502 to 530, on the UI 112A.

In accordance with an embodiment, the specific set of electronically controllable sprayer nozzles are operated further based on a predefined operating zone (indicated by the UI element 516) of the vehicle 104, where the predefined operating zone (indicated by the UI element 516) defines a range of speed of the vehicle 104 in which an accuracy of the detection sensitivity of the crop plant is greater than a threshold. The predefined operating zone of the vehicle 104 means that when the vehicle 104 is moved through the agricultural field 106 in a specific range of speed, for example, from 40 to 70 cm/second (s), the accuracy of the detection sensitivity of the crop plant is greater than the threshold. Alternatively stated, the crop plant can be detected, tracked, identified with a crop type, and distinguished with weeds and any other green looking objects with improved accuracy in the predefined operating zone of the vehicle 104.

In an implementation, a custom application 112 is pre-installed in the display device 110. The custom application 112 has many UI interfaces, where the UI 112A is one of the many UI interfaces. The custom application 112 is designed and configured to directly establish a communication with a Robot Operating System (ROS) layer of the system 102 to perform any specified operations of the system 102.

The UI elements 502 indicates a driver role and corresponding functions made available to a user operating the vehicle 104 as per the defined driver role. The UI element 504 indicates a connection status of the system 102. The UI element 504 indicates a spray mode 506 selected as a perceptive spot spraying mode. The UI element 508 indicates a predetermined boom height range that is optimal for a tallest plant height determined by the system 102 as well a current boom height from the ground plane. The boom height range is determined for a given plant height based on experimentation where an optimal result was achieved previously and saved in a database for later use. The UI element 510 indicates a type of crop plant (such as a cotton plant in this case) that is current object-of-interest, to be acted on or sprayed with a specified chemical. The UI element 512 indicates a geospatial sensor signal quality (e.g., GPS signal quality) is good or not and also from the external device 108. The UI element 514 indicates battery status of the system 102 to power the components of the system 102. The UI element 518 indicates a current device activity status, i.e., whether the system 102 is in operation or idle. The UI element 520 indicates a pause or resume function in terms of operation of the system 102. The UI element 522 provides a control to visualize/update various operations and its corresponding settings or parameters. The UI element 524 is a sprayer control that provides an option to test and manually enable or disable some selected electronically controllable sprayer nozzles of the different set of electronically controlled sprayer nozzles 116. Such manual selection is sometimes needed to avoid double spraying of chemicals or under some unforeseen scenarios. An example is of such circumstance is explained in FIG. 7B. In an implementation, the different set of electronically controlled sprayer nozzles 116 may be segregated into different units, such as a first sprayer unit, a second sprayer unit, and a third sprayer unit. Each sprayer unit may include certain number of electronically controllable sprayer nozzles, for example, 5-10 or 8 electronically controllable sprayer nozzles. Moreover, each sprayer unit may be regulated and controlled by input received from one image-capture device of the plurality of image-capture devices 118. This segregation makes the processing very fast and avoids any unwanted delay or error in processing to accurately operate the system 102 for controlled and perceptive spraying of chemical as per need. The UI element 526 is a control to start or stop the system 102. When a user input that corresponds to the start of the system 102 is provided, all sensors and components of the system 102 are activated via commands shared with the ROS layer of the system 102. The UI element 528 is a control to check and run nozzle calibration before start of a spray session to make sure the different set of electronically controlled sprayer nozzles 116 are clean and ready to operate. Based on a user input (e.g., a touch input) on icon of each spray nozzle, it can be verified if the nozzle is operating as expected. The icon changes to indicate a correct functioning of the selected nozzle to the user while the user within the vehicle. The UI element 530 indicates an operations setup for a user-controlled spray mode selection, a crop selection, or a crop height verification or edit option, if needed in any situation.

Figure 6:
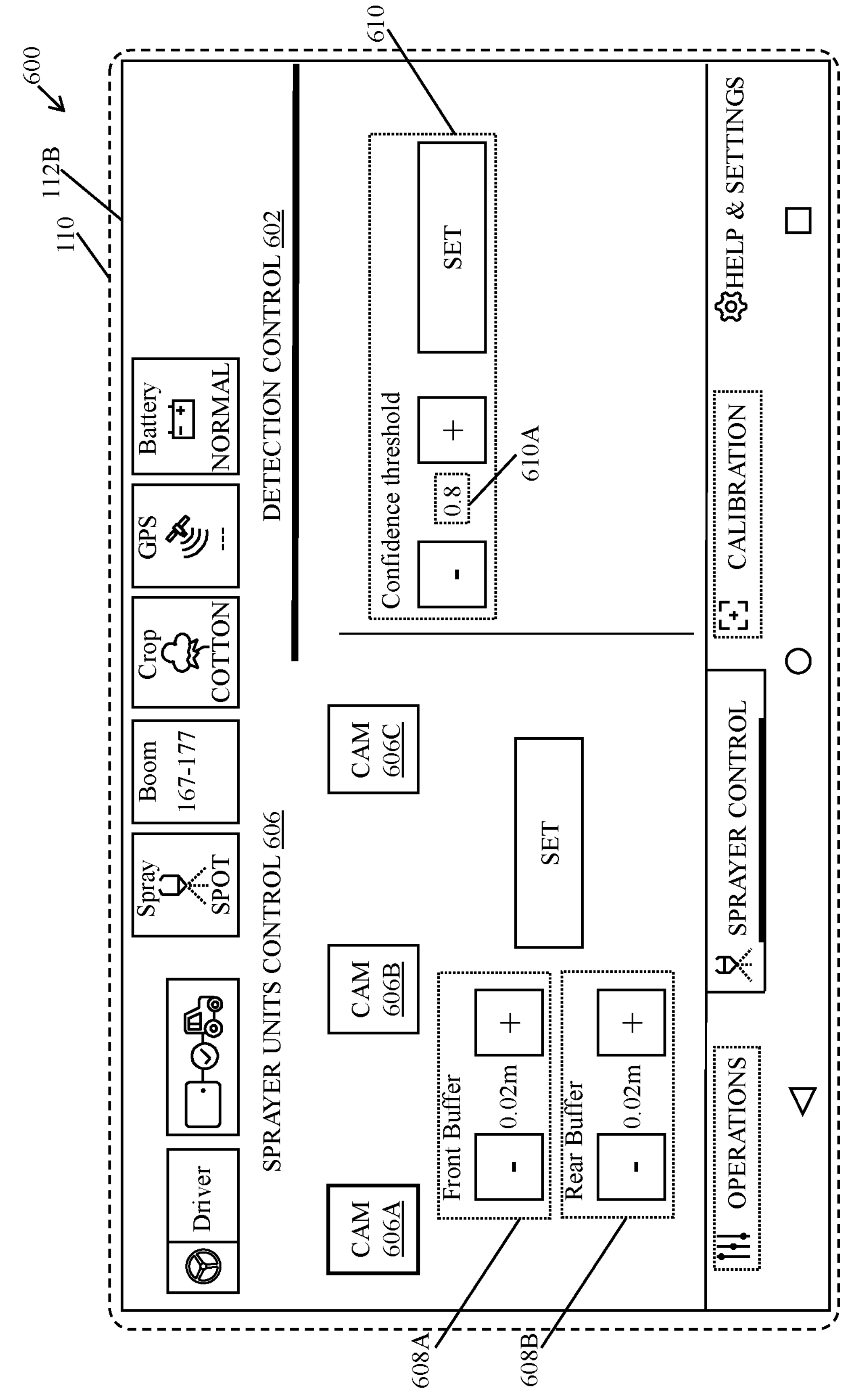
FIG. 6 is an exemplary scenario of setting a defined confidence threshold and camera buffers, in accordance with an embodiment of the present disclosure.

FIG. 6 is an exemplary scenario of setting a defined confidence threshold and camera buffers, in accordance with an embodiment of the present disclosure. FIG. 4 is described in conjunction with elements from FIGS. 1A, 1B, 2, 3A, 3B, 4, and 5. With reference to FIG. 6, there is shown an exemplary scenario 600 that illustrates setting of the defined confidence threshold 610A on the UI 112B rendered on the display device 110. There is further shown different UI elements, such as UI elements 602 to 610, on the UI 112B.

In an implementation, the defined confidence threshold 610A is set in real-time or near real-time in the AI model 210 of the system 102. Alternatively, the defined confidence threshold 610A is pre-set via the UI 112B rendered on the display device 110 communicatively coupled to the one or more hardware processors 202. In yet another implementation, the defined confidence threshold 610A is adaptive and may automatically be changed depending on a surrounding environment condition, a crop type, and/or a captured image input from the plurality of image-capture devices 118. Examples of the surrounding environmental conditions while capturing images of agricultural field may include, but are not limited to a variation in sunlight due to either clouds, rain, a shadow of a large object, like tree, in an image, a change in position of sun throughout the day, a change in light intensity, a time of day when farming is done etc, an extent of resistance from mud in the agricultural field 106.

In the exemplary scenario 600, the UI element 602 is a detection control that controls detection sensitivity of the crop plant by calibrating the defined confidence threshold 610A as indicated by the UI element 610. The defined confidence threshold 610A is automatically (or optionally manually) increased or decreased, depending on the requirement. If the defined confidence threshold 610A increases, detection sensitivity of the crop plant increases. The confidence threshold value may range from 0 to 1. An increase or decrease of the defined confidence threshold 610A increases changes i.e., increases or decreases the perceptiveness of the system 102. For example, at a first defined confidence threshold, say 0.X1, the one or more hardware processors 202 are configured to distinguish between green looking objects, such as crop plants and weeds. At a second defined confidence threshold, say 0.X2, the one or more hardware processors 202 are configured to further distinguish between a type of crop plant and a type of weed. At a third defined confidence threshold, say 0.X3, the one or more hardware processors 202 are configured to further distinguish between a diseased or a non-diseased crop plant and further distinguish weeds from such diseased or non-diseased crop plants. At a fourth defined confidence threshold, say 0.X4, the one or more hardware processors 202 are configured to further increase crop detection sensitivity such that a discoloured plant or non-discoloured plant, a growth state of the crop plant, a lack of nutrient etc. can be further sensed and additionally distinguish from weeds. Such detection sensitivity is very advantageous and provides a technical effect of increased perceptiveness of the system 102 resulting in improved performance of the system 102, such as reduced wastage of chemical used for spraying. Alternatively state, the use of the defined confidence threshold 610A significantly improves the perceptive capability of the system 102 such that the spraying of chemicals is achieved with improved accuracy and precision for the correct time slots, at correct intended areas or spots and only when required with correct amount of spray and correct selection of a type of chemical irrespective of any change in the surrounding environmental conditions while capturing images of agricultural field. For example, an increase or a decrease in the defined confidence threshold 610A dynamically changes the detection sensitivity of the crop plant increasing the perceptive capability of the system 102 making the system failsafe.

In an example, two different chemicals can be loaded in two different chemical storage chamber in the vehicle 104. A specific chemical type is used only when a discoloured crop plant is detected by a specific nozzle while some nozzles may use another chemical to spray on normal/healthy crop plant, and remaining nozzles may be deactivated to stop spraying on weeds or unwanted regions. Thus, different applications are made possible by calibration of the defined confidence threshold 610A.

In accordance with an embodiment, the one or more hardware processors 202 are configured to update the defined confidence threshold in response to a change in a quality parameter of the captured plurality of FOVs of the plurality of defined areas of the agricultural field 106. For example, when there is a change in the quality parameter of the captured plurality of FOVs, that means some images are captured in a sunny environment, a few images are captured in a cloudy environment and a few other images are captured in rainy environment or there is some shadow, then according to the change in the quality parameter, the defined confidence threshold 610A is dynamically updated to maintain the spray accuracy greater than a threshold, for example, greater than 95-99.99%.

In an example, the one or more hardware processors 202 are configured to determine precision and recall values for different confidence threshold values ranging from 0.1-0.99. The confidence threshold may be selected by identifying and selecting an optimal point in dataset of the precision and recall values that meets the required high recall and at the same time maintaining high enough precision values associated with the detection sensitivity of the AI model. When a precision value is highest, the recall value may be lowest. Thus, a right mix of precision and recall value is reflected in a given confidence threshold value.

In an implementation, the UI element 604 is a sprayer units' control where a front buffer 608A and a rear buffer 608B associated with each image-capture device indicated by UI elements 606A, 606B, and 606C, of the plurality of image-capture devices 118, may be set. Such setting may occur automatically by the one or more hardware processors 202 or may be done based on a user input. The one or more hardware processors 202 are further configured to determine one or more regions in the agricultural field 106 where to spray a chemical based on the executed mapping of pixel data, the defined confidence threshold 610A, and the front buffer 608A and the rear buffer 608B associated with each image-capture device of the plurality of image-capture devices 118. For example, if a region is determined as 15 cm length and 15 cm breadth. Thus, increasing the front buffer 608A to 5 cm may extend the spray region ahead of the crop plant by 5 cm, for example, now 20 cm length. Similarly, increasing the rear buffer 608B, say by 3 cm, may dynamically extend the spray area to 3 cm from the rear end/behind the crop plant in the direction of movement of the vehicle 104.

Figure 7A:
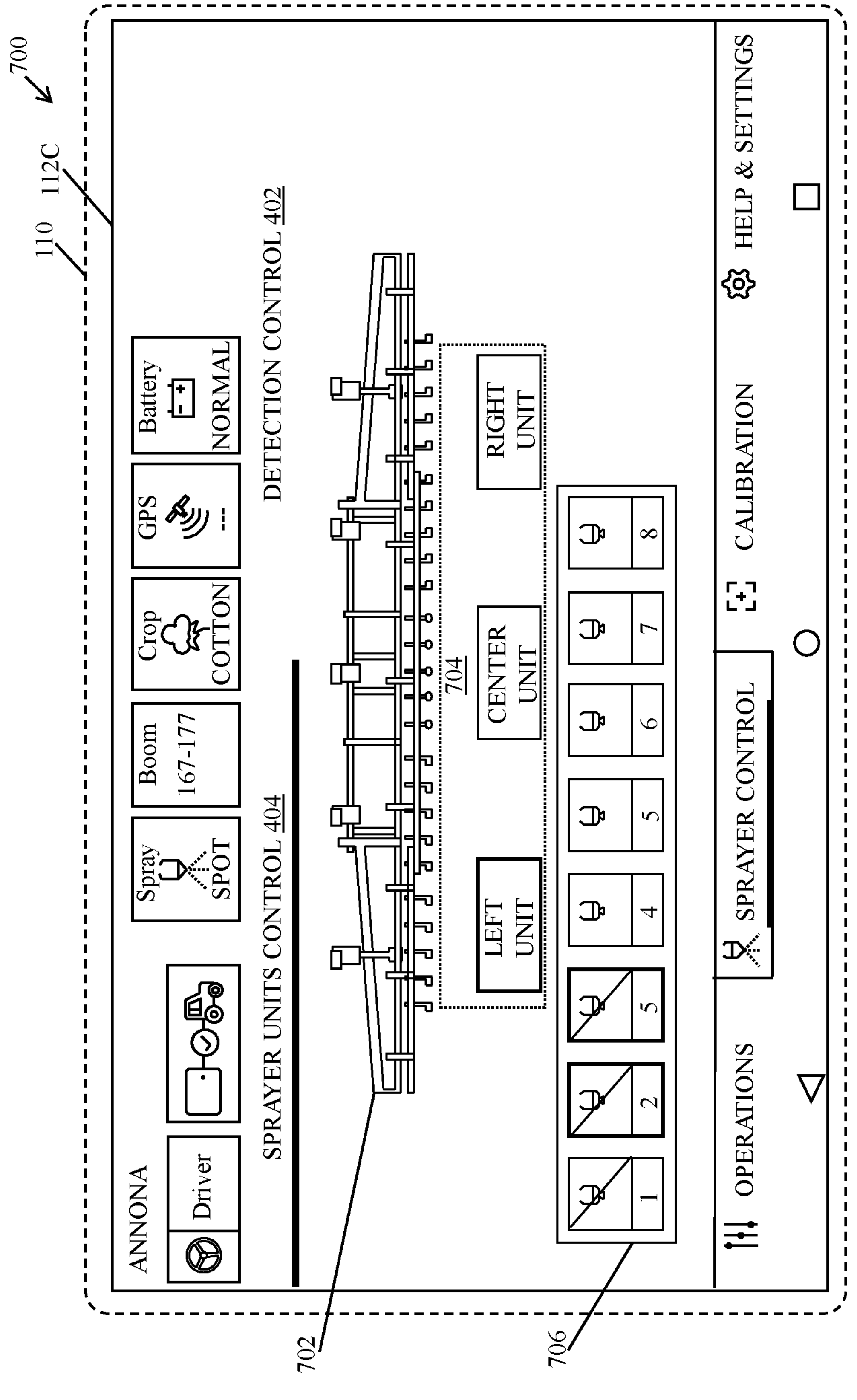
FIGS. 7A and 7B are diagrams collectively illustrating an exemplary scenario for implementation of the system and method for controlled and perceptive chemical spraying on an agricultural field, in accordance with an embodiment of the present disclosure.
Figure 7B:
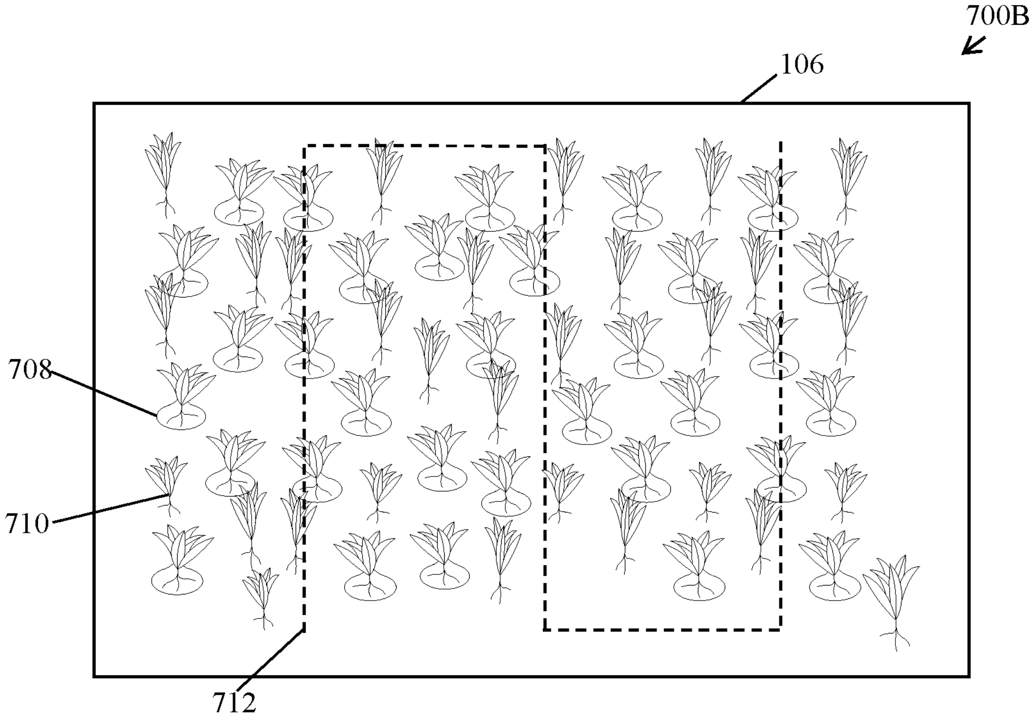

FIGS. 7A and 7B are diagrams collectively illustrating an exemplary scenario for implementation of the system and method for controlled and perceptive chemical spraying on an agricultural field, in accordance with an embodiment of the present disclosure. FIG. 7A is described in conjunction with elements from FIGS. 1, 2, 3A, 3B, 4, 5, and 7. With reference to FIG. 7A, there is shown an exemplary scenario 700A that illustrates the operating zone of the vehicle 104 (of FIG. 1) via a UI 112C rendered on the display device 110. There is further shown different UI elements, such as UI elements 702 to 706, on the UI 112C.

In the exemplary scenario 700A, the UI element 702 indicates position of the boom arrangement 114. The UI element 702 is used to control the different set of electronically controlled sprayer nozzles 116. The different set of electronically controlled sprayer nozzles 116 are divided into three units (represented by the UI element 704), for example, a left unit, a right unit, and a centre unit. There is further shown a selection of the left unit (represented by a thick box). Moreover, the UI element 706 indicates that the left unit includes a total of eight electronically controllable sprayer nozzles out of which first three sprayer nozzles are deactivated manually by use of the UI element 706. In another implementation scenario, the first three sprayer nozzles can be automatically deactivated by use of the AI model 210. The deactivation of the first three sprayer nozzles is performed in order to perform the controlled and perceptive chemical spraying on the agricultural field 106, for example, not to spray again crop plants when the vehicle 104 moves in opposite direction to cover another set of crop plants, like shown, for example, in FIG. 7B.

With reference to FIG. 7B, there is shown an implementation scenario 700B that illustrates selection of the specific set of electronically controllable sprayer nozzles from amongst the different set of electronically controlled sprayer nozzles 116 of the boom arrangement 114. In the implementation scenario 700B, there is shown that the agricultural field 106 comprises a plurality of crop plants, such as a crop plant 708 (e.g., cotton plants) and a plurality of weeds, such as a weed 710. The plurality of crop plants and the plurality of weeds are grown unevenly in the agricultural field 106. A dotted path 712 illustrates the movement of the vehicle 104 across the agricultural field 106. As the implementation scenario 700B illustrates a specific area of the agricultural field 106, thus the dotted path 712 for the movement of the vehicle 104 can vary to cover full area of the agricultural field 106. The system 102 is configured to spray the chemicals on the plurality of crop plants only of the agricultural field 106. When the vehicle 104 starts moving across the agricultural field 106 in a first direction until edge of the portion of the agricultural field 106 is reached, some of the predefined number of electronically controlled sprayer nozzles 116 are activated automatically based on the predefined confidence threshold and the executed mapping of pixel data of crop plants and weeds from captured images. However, when the vehicle 104 takes its first turn and starts moving in a second direction (opposite direction) on the dotted path 712, then in such cases, a part of the boom arrangement 114 may cover some crop plants already sprayed previously by the system 102. In such situation, automatically spraying by the system 102 may cause the double spraying on such previously sprayed crop plants. Thus, the system 102 provides an option of manual deactivation of some electronically controlled sprayer nozzles, say of right unit, to override any automatic activation of manually deactivated electronically controlled sprayer nozzles when crop plants are detected and comes underneath such spray nozzles. Whereas remaining electronically controlled sprayer nozzles which are not manually deactivated continue to operate automatically to cover and spray chemical on other new crop pants while moving in that second direction.

Figure 8A:
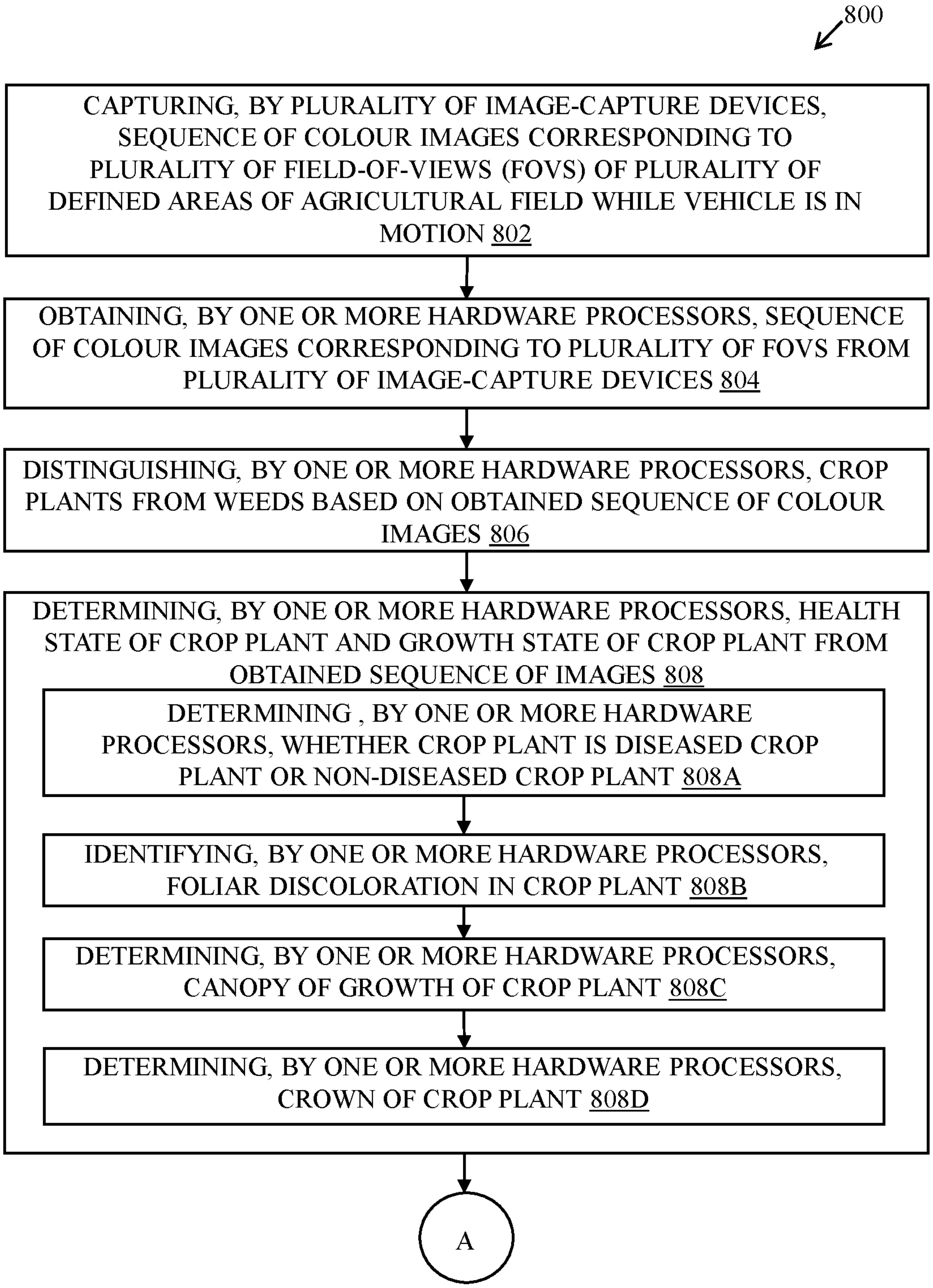
FIGS. 8A and 8B collectively is a flowchart of a method for controlled and perceptive chemical spraying on an agricultural field, in accordance with an embodiment of the present disclosure.
Figure 8B:
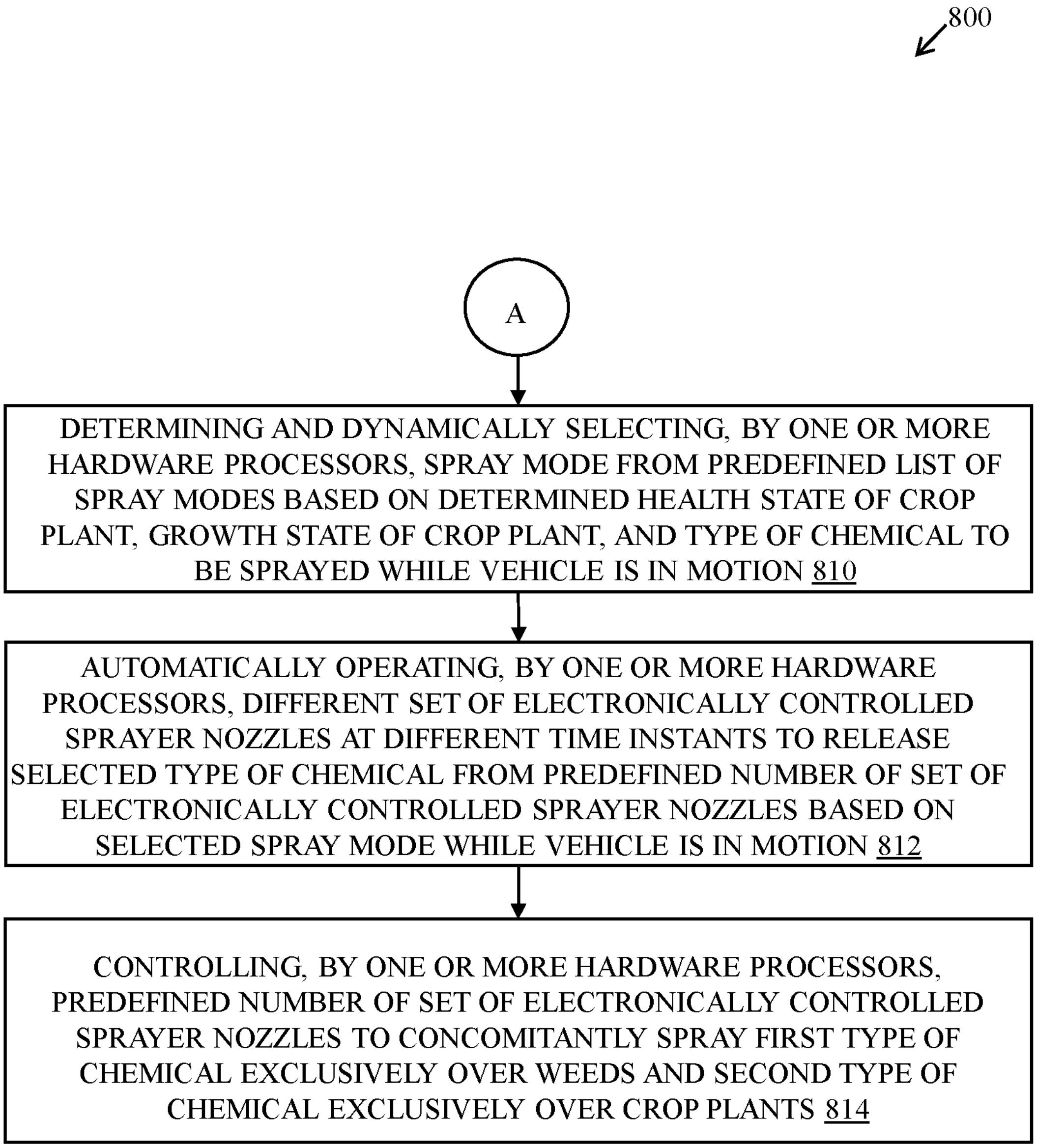

FIGS. 8A and 8B collectively is a flowchart of a method for controlled and perceptive chemical spraying on an agricultural field, in accordance with an embodiment of the present disclosure. FIGS. 8A and 8B is described in conjunction with elements from FIGS. 1, 2, 3A, 3B, 4, 5, 6, 7A, and 7B. With reference to FIGS. 8A and 8B, there is shown a method 800 for use in the vehicle 104 (of FIG. 1) for controlled and perceptive chemical spraying on the agricultural field 106. The method 800 includes operations 802 to 814. The method 800 is executed by the one or more hardware processors 202 of the system 102 (of FIG. 1).

At 802, the method 800 comprises capturing, by a plurality of image-capture devices 118, a sequence of colour images corresponding to a plurality of field-of-views (FOVs) of a plurality of defined areas of the agricultural field 106 while the vehicle 104 is in motion.

At 804, the method 800 further comprises obtaining, by one or more hardware processors 202, the sequence of colour images corresponding to the plurality of FOVs from the plurality of image-capture devices 118.

At 806, the method 800 further comprises distinguishing crop plants from weeds based on the obtained sequence of colour images.

At 808, the method 800 further comprises determining, by the one or more hardware processors 202, a health state of a crop plant and a growth state of the crop plant from the obtained sequence of colour images. The operation 806 comprises one or more sub-operations, such as operations 806A and 806B. At 808A, it may be determined whether the crop plant is a diseased crop plant or a non-diseased crop plant for the determination of the health state of the crop plant from the obtained sequence of colour images. At 808B, a foliar discoloration may be identified in the crop plant for the determination of the health state of the crop plant from the obtained sequence of colour images. At 808C, a canopy of growth of the crop plant may be determined for the determination of the health state of the crop plant from the obtained sequence of colour images. At 808D, a crown of the crop plant may be determined for the determination of the growth state of the crop plant from the obtained sequence of colour images.

At 810, the method 800 further comprises determining and dynamically selecting, by the one or more hardware processors 202, a spray mode from a predefined list of spray modes based on the determined health state of the crop plant, the growth state of the crop plant, and a type of chemical to be sprayed while the vehicle 104 is in motion. In an implementation, the predefined list of spray modes comprises a perceptive spot spray mode, a herbicide spray mode, a pesticide spray mode, a diseased-plant spray mode, a nutrient spray mode, a blanket spray mode, an all-green spray mode, a foliar discoloration spray mode, or a combinatorial spray mode in which any two or more spray modes are concomitantly selected.

At 812, the method 800 further comprises automatically operating, by the one or more hardware processors 202, a different set of electronically controlled sprayer nozzles 116 at different time instants to release the selected type of chemical from a predefined number of the electronically controlled sprayer nozzles based on the selected spray mode while the vehicle 104 is in motion.

At 814, the method 800 further comprises controlling the predefined number of the set of electronically controlled sprayer nozzles to concomitantly spray a first type of chemical exclusively over the weeds and a second type of chemical exclusively over the crop plants.

In an implementation, the different set of electronically controlled sprayer nozzles are operated automatically to release two different types of chemicals concurrently when two different categories of crop plants are identified. In an implementation, the different set of electronically controlled sprayer nozzles are operated to release two or more different types of chemicals concurrently or alternatively when two or more different categories of crop plants and different categories of weeds are identified.

The operations 802 to 814 are only illustrative and other alternatives can also be provided where one or more steps are added, one or more steps are removed, or one or more steps are provided in a different sequence without departing from the scope of the claims herein. Various embodiments and variants disclosed with the aforementioned system (such as the system 102) apply mutatis mutandis to the aforementioned method 800.

Modifications to embodiments of the present disclosure described in the foregoing are possible without departing from the scope of the present disclosure as defined by the accompanying claims. Expressions such as “including”, “comprising”, “incorporating”, “have”, “is” used to describe and claim the present disclosure are intended to be construed in a non-exclusive manner, namely allowing for items, components or elements not explicitly described also to be present. It is appreciated that certain features of the present disclosure, which are, for clarity, described in the context of separate embodiments, may also be provided in combination in a single embodiment. Conversely, various features of the present disclosure, which are, for brevity, described in the context of a single embodiment, may also be provided separately or in any suitable combination or as suitable in any other described embodiment of the disclosure.

What is claimed is:

1. A system mounted in a vehicle, comprising:

a plurality of cameras configured to capture a sequence of colour images corresponding to a plurality of field-of-views (FOVs) of a plurality of defined areas of an agricultural field while the vehicle is in motion; and one or more hardware processors configured to:

obtain the sequence of colour images corresponding to the plurality of FOVs from the plurality of cameras;

determine a defined confidence threshold indicative of a detection sensitivity of a crop plant;

determine a health state of the crop plant and a growth state of the crop plant from the obtained sequence of colour images;

execute a mapping of pixel data of the crop plant in the obtained sequence of colour images to distance information from a reference position of a boom arrangement mounted on the vehicle, while the vehicle is in motion;

determine and dynamically select a spray mode from a predefined list of spray modes based on the determined health state of the crop plant, the growth state of the crop plant, and a type of chemical to be sprayed while the vehicle is in motion;

automatically operate a different set of electronically controlled sprayer nozzles at different time instants to release the type of chemical from a predefined number of the set of electronically controlled sprayer nozzles, based on the selected spray mode, the defined confidence threshold and the executed mapping of pixel data, while the vehicle is in motion.

2. The system according to claim 1, wherein the determination of the health state of the crop plant from the obtained sequence of colour images comprises determining whether the crop plant is a diseased crop plant or a non-diseased crop plant.

3. The system according to claim 2, wherein the determination of the health state of the crop plant from the obtained sequence of colour images further comprises identifying a foliar discoloration in the crop plant.

4. The system according to claim 1, wherein the determination of the growth state of the crop plant from the obtained sequence of colour images comprises determining a canopy of growth of the crop plant.

5. The system according to claim 4, wherein the determination of the growth state of the crop plant from the obtained sequence of colour images comprises determining a crown of the crop plant.

6. The system according to claim 1, wherein the one or more hardware processors are further configured to:

distinguish crop plants from weeds based on the obtained sequence of colour images; and control the predefined number of the set of electronically controlled sprayer nozzles to concomitantly spray a first type of chemical exclusively over the weeds and a second type of chemical exclusively over the crop plants.

7. The system according to claim 1, wherein the predefined list of spray modes comprises a perceptive spot spray mode, a herbicide spray mode, a pesticide spray mode, a diseased-plant spray mode, a nutrient spray mode, a blanket spray mode, an all-green spray mode, a foliar discoloration spray mode, or a combinatorial spray mode in which any two or more spray modes are concomitantly selected.

8. The system according to claim 1, wherein the different set of electronically controlled sprayer nozzles are operated automatically to release two different types of chemicals concurrently when two different categories of crop plants are identified.

9. The system according to claim 1, wherein the different set of electronically controlled sprayer nozzles are operated to release two or more different types of chemicals concurrently or alternatively when two or more different categories of crop plants and different categories of weeds are identified.

10. A method of operation of a system mounted in a vehicle, comprising:

capturing, by a plurality of cameras, a sequence of colour images corresponding to a plurality of field-of-views (FOVs) of a plurality of defined areas of an agricultural field while the vehicle is in motion;

obtaining, by one or more hardware processors, the sequence of colour images corresponding to the plurality of FOVs from the plurality of cameras;

determining, by the one or more hardware processors, a defined confidence threshold indicative of a detection sensitivity of a crop plant;

determining, by the one or more hardware processors, a health state of the crop plant and a growth state of the crop plant from the obtained sequence of colour images;

executing, by the one or more processors, a mapping of pixel data of the crop plant in the obtained sequence of colour images to distance information from a reference position of a boom arrangement mounted on the vehicle, while the vehicle is in motion;

determining and dynamically selecting, by the one or more hardware processors, a spray mode from a predefined list of spray modes based on the determined health state of the crop plant, the growth state of the crop plant, and a type of chemical to be sprayed while the vehicle is in motion; and automatically operating, by the one or more hardware processors, a different set of electronically controlled sprayer nozzles at different time instants to release the selected type of chemical from a predefined number of the electronically controlled sprayer nozzles based on the selected spray mode, the defined confidence threshold and the executed mapping of pixel data, while the vehicle is in motion.

11. The method according to claim 10, further comprising determining whether the crop plant is a diseased crop plant or a non-diseased crop plant for the determination of the health state of the crop plant from the obtained sequence of colour images.

12. The method according to claim 10, further comprising identifying a foliar discoloration in the crop plant for the determination of the health state of the crop plant from the obtained sequence of colour images.

13. The method according to claim 10, further comprising determining a canopy of growth of the crop plant for the determination of the health state of the crop plant from the obtained sequence of colour images.

14. The method according to claim 10, further comprising determining a crown of the crop plant for the determination of the growth state of the crop plant from the obtained sequence of colour images.

15. The method according to claim 10, further comprising distinguishing crop plants from weeds based on the obtained sequence of colour images.

16. The method according to claim 15, further comprising controlling the predefined number of the set of electronically controlled sprayer nozzles to concomitantly spray a first type of chemical exclusively over the weeds and a second type of chemical exclusively over the crop plants.

17. The method according to claim 10, wherein the predefined list of spray modes comprises a perceptive spot spray mode, a herbicide spray mode, a pesticide spray mode, a diseased-plant spray mode, a nutrient spray mode, a blanket spray mode, an all-green spray mode, a foliar discoloration spray mode, or a combinatorial spray mode in which any two or more spray modes are concomitantly selected.

18. The method according to claim 10, wherein the different set of electronically controlled sprayer nozzles are operated automatically to release two different types of chemicals concurrently when two different categories of crop plants are identified.

19. The method according to claim 10, wherein the different set of electronically controlled sprayer nozzles are operated to release two or more different types of chemicals concurrently or alternatively when two or more different categories of crop plants and different categories of weeds are identified.

* * * * *